(12) United States Patent
Hatakeyama

(10) Patent No.: US 10,138,776 B2
(45) Date of Patent: Nov. 27, 2018

(54) EXHAUST GAS PURIFYING DEVICE FOR INTERNAL COMBUSTION ENGINE

(71) Applicant: HONDA MOTOR CO., LTD., Tokyo (JP)

(72) Inventor: Yoshiaki Hatakeyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 171 days.

(21) Appl. No.: 15/133,711

(22) Filed: Apr. 20, 2016

(65) Prior Publication Data

US 2016/0348552 A1   Dec. 1, 2016

(30) Foreign Application Priority Data

May 25, 2015   (JP) .................. 2015-105325

(51) Int. Cl.
*F01N 3/022*   (2006.01)
*B01D 53/94*   (2006.01)

(52) U.S. Cl.
CPC ....... *F01N 3/0222* (2013.01); *B01D 53/9454* (2013.01); *B01D 53/944* (2013.01); *B01D 2255/104* (2013.01); *B01D 2255/1021* (2013.01); *B01D 2255/1023* (2013.01); *B01D 2255/1025* (2013.01); *Y02T 10/22* (2013.01)

(58) Field of Classification Search
None
See application file for complete search history.

(56) References Cited

U.S. PATENT DOCUMENTS 6,274,099 B1   8/2001   Maus et al.
7,048,896 B2   5/2006   Nagel et al.
(Continued)

FOREIGN PATENT DOCUMENTS

DE   44 37 718 A1   4/1996
JP   2015-054305 A   3/2015
(Continued)

OTHER PUBLICATIONS

German Search Report application No. 10 2016 208 525.5 dated Feb. 15, 2017.
(Continued)

*Primary Examiner* — Walter D. Griffin
*Assistant Examiner* — Jelitza M Perez
(74) *Attorney, Agent, or Firm* — Squire Patton Boggs (US) LLP

(57) ABSTRACT

An exhaust gas purifying device includes a honeycomb carrier which extends from an inlet-side end face to an outlet-side end face of exhaust gas to form a pathway of exhaust gas, and a tubular case member that houses the honeycomb carrier via a retaining member. The honeycomb carrier includes a sloped part formed at an outer circumferential part at both end faces in an X direction thereof in a direction in which the length in the X direction of the outer circumferential edge thereof decreases, and is retained inside of the case member by the sloped part catching on an inner wall of the case member via the retaining member. The case member has a reduced-diameter part provided in a portion thereof in which an inside diameter of an inlet-side terminal part thereof is smaller than at least an outside diameter of the inlet-side terminal part of the honeycomb carrier.

8 Claims, 16 Drawing Sheets

(56) References Cited

U.S. PATENT DOCUMENTS

| | | |
|---|---|---|
| 7,438,868 B2 | 10/2008 | Kato |
| 7,763,222 B2 | 7/2010 | Miyairi et al. |
| 2005/0142043 A1 | 6/2005 | Pekrul et al. |
| 2014/0178260 A1* | 6/2014 | Duda ........................ F01N 3/28 |
| | | 422/168 |
| 2016/0348552 A1 | 12/2016 | Hatakeyama |

FOREIGN PATENT DOCUMENTS

| | | |
|---|---|---|
| JP | 2016-217305 A | 12/2016 |
| WO | 2016088523 A1 | 6/2016 |
| WO | 2016121784 A1 | 8/2016 |

OTHER PUBLICATIONS

German Office Action application No. 10 2016 208 525.5 dated Feb. 16, 2017.

* cited by examiner

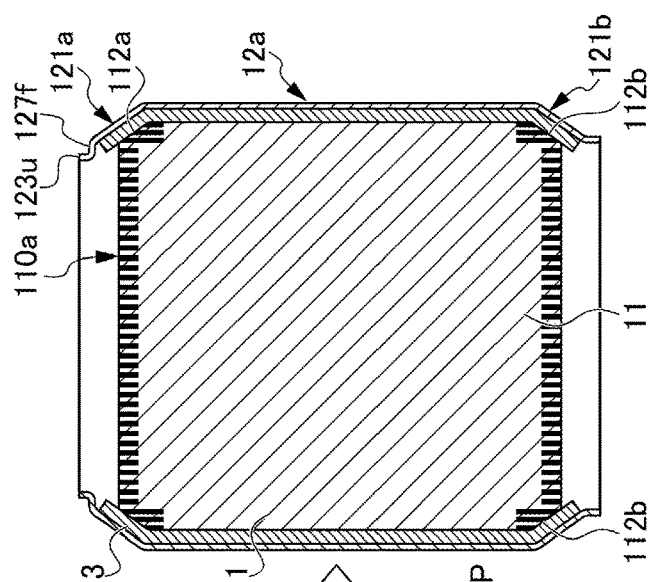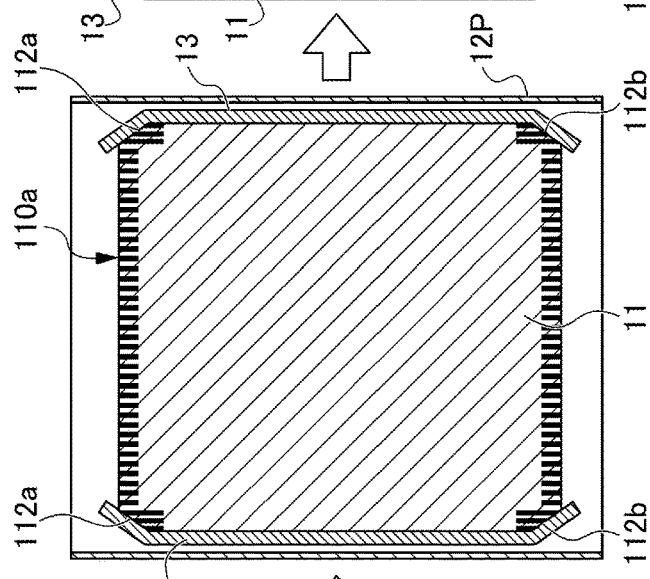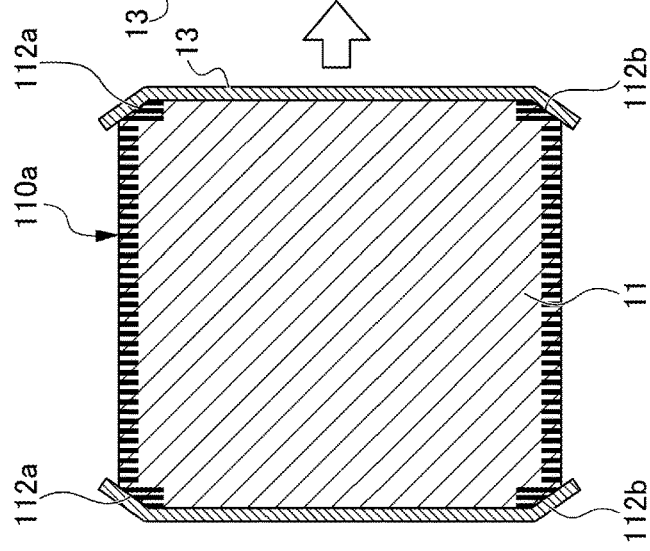

EXHAUST GAS PURIFYING DEVICE FOR INTERNAL COMBUSTION ENGINE

This application is based on and claims the benefit of priority from Japanese Patent Application No. 2015-105325, filed on 25 May 2015, the content of which is incorporated herein by reference.

BACKGROUND OF THE INVENTION

Field of the Invention

The present invention relates to an exhaust gas purifying device for an internal combustion engine.

Related Art

Conventionally, the exhaust gas purifying device provided in the exhaust channel of an internal combustion engine is configured to include a carrier (honeycomb carrier) on which an exhaust gas purifying catalyst is supported, and a tubular case member that houses this carrier. Upon housing the carrier inside the case member, it is important to reliably retain the carrier inside the case member.

In order to reliably retain the carrier inside the case member, it has been known to adopt a configuration that interposes a retaining member called a mat between the case member inner circumferential face and the carrier outer-circumferential face. In the case of adopting this configuration, the retaining member may produce erosion by being exposed to the exhaust flow, and technology for suppressing such erosion has been proposed (for example, refer to Patent Document 1). With the technology published in Patent Document 1, it is said to be possible to suppress the occurrence of erosion by clogging the mesh at the outer circumference of the carrier supporting the catalyst with a clogging material, thereby avoiding the exhaust gas flow impinging on the retaining member provided more to the radially outer side than the carrier.

Patent Document 1: Japanese Unexamined Patent Application, Publication No. 2015-54305

SUMMARY OF THE INVENTION

Generally, the retaining member is arranged mostly spanning from a position on the inlet-side end face to a position on the outlet-side end face of the exhaust gas flow relative to the carrier; however, erosion is naturally suppressed so long as adopting an arrangement in which the ends of this retaining member sufficiently are recessed from the respective positions at the above-mentioned inlet-side end face and outlet-side end face.

However, in order to make the retaining of the carrier by the retaining member reliable, the ends of the retaining member cannot be made to recess much from the respective positions on the above-mentioned inlet-side end face and outlet-side end face, and instead, it requires protruding a little to a permissible extent.

With the technology of Patent Document 1, it is necessary to provide clogging at a major portion of the carrier in order to sufficiently suppress the occurrence of erosion on the retaining member. However, if the ratio of the clogged portion of the carrier rises, although the erosion suppressing effect will rise, there is a problem in that the loss of effective volume of the carrier increases.

The present invention has been made taking account of the above-mentioned situation, and has an object of providing an exhaust gas purifying device for an internal combustion engine that can make the retaining of the carrier by the retaining member reliable, while minimizing the loss in effective volume of the carrier.

In order to achieve the above-mentioned object, the following such technology is proposed herein.

According to a first aspect of the present invention, an exhaust gas purifying device (e.g., the exhaust gas purifying device 1 described later) that is provided in an exhaust channel of an internal combustion engine and purifies exhaust gas of the internal combustion engine, includes: a columnar honeycomb carrier (e.g., the honeycomb carrier 11 described later) in which a plurality of cells, which extend from an inlet-side end face to an outlet-side end face of exhaust gas to form pathways of exhaust gas, is divided and formed by porous partition walls; and a tubular case member (e.g., the case member 12 described later) that houses the honeycomb carrier via a retaining member (e.g., the retaining member 13 described later), in which the honeycomb carrier includes a sloped part (e.g., the sloped part 121a described later) or stepped part formed at an outer circumferential side of both end faces (e.g., both end faces 110a, 110b in a central axis X direction described later) in a central axis direction thereof and formed so that a cross-sectional area orthogonal to the central axis direction becomes larger towards a side of an outer circumferential edge thereof, and is retained inside of the case member by the sloped part or stepped part catching in an inner wall of the case member via the retaining member, and the case member has a reduced-diameter part (e.g., the reduced-diameter part 124 described later) provided to at least part of an end on an exhaust gas inlet side thereof and with an inside diameter (e.g., the inside diameter d42 described later) smaller than the outside diameter (e.g., the outside diameter d41 described later) of a central part of the honeycomb carrier, excluding the sloped part or stepped part in the inlet-side end face.

With the exhaust gas purifying device for an internal combustion engine of the above-mentioned first aspect, a columnar honeycomb carrier in which a plurality of cells, which extend from an inlet-side end face to an outlet-side end face for exhaust gas of this internal combustion engine to form pathways of exhaust gas, is divided and formed by porous partition walls; and a tubular case member that houses this honeycomb carrier via a retaining member are provided in the exhaust channel of this internal combustion engine. Herein, the honeycomb carrier forms a sloped part or stepped part that is formed at an outer circumferential side of both end faces in the central axis direction thereof and formed so that the cross-sectional area orthogonal to the central axis direction increases towards the outer circumferential edge side thereof. In other words, the sloped part or stepped part is formed in a direction in which the length in the central axis direction of the outer circumferential edge of the honeycomb carrier decreases. Then, this sloped part or stepped part is retained inside of the case member by configuring so as to catch in the inner wall of the case member via the retaining member. In addition, the case member has the reduced-diameter part provided to at least part of an end on an exhaust gas inlet side thereof and with an inside diameter smaller than the outside diameter of a central part, excluding the sloped part or stepped part in the inlet-side end face of the honeycomb carrier.

Since the exhaust gas flow is constricted by this reduced-diameter part, erosion of the retaining member is suppressed. In addition, the retaining of the honeycomb carrier inside of the case member is reliably carried out.

According to a second aspect of the present invention, in the exhaust gas purifying device for an internal combustion engine as described in the first aspect, the reduced-diameter part has a flat part (e.g., the flat part 127a described later) provided substantially in parallel with an end face (e.g., the inlet-side end face 110a described later) at the central part of the honeycomb carrier.

With the exhaust gas purifying device for an internal combustion engine of the above-mentioned second aspect, particularly in the exhaust gas purifying device for an internal combustion engine of the above-mentioned first aspect, the reduced-diameter part of the case member has a flat part that is substantially parallel to the end face of the honeycomb carrier. For this reason, the exhaust gas flow is much more reliably constricted, whereby erosion of the retaining member is effectively suppressed. In addition, the retaining of the honeycomb carrier inside of the case member is much more reliably carried out.

According to a third aspect of the present invention, the exhaust gas purifying device for an internal combustion engine as described in the first or second aspect further includes an exhaust gas purifying catalyst loaded on the honeycomb carrier, in which an inside diameter at a part other than the reduced-diameter part at an end on the exhaust gas inlet side of the case member is a size equal to or greater than the outside diameter of the central part of the honeycomb carrier.

With the exhaust gas purifying device for an internal combustion engine of the above-mentioned third aspect, the exhaust gas purifying device for an internal combustion engine of the above-mentioned first or second aspect further includes an exhaust gas purifying catalyst loaded on the honeycomb carrier, and since the inside diameter of the case member at a part other than the reduced-diameter part at an end on the exhaust gas inlet side is a size equal to or larger than the outside diameter of the central part of the honeycomb carrier, the effective volume of the honeycomb carrier, i.e. effective portion of loaded catalyst, is ensured to be large, and thus the exhaust gas purifying performance improves.

According to a fourth aspect of the present invention, in the exhaust gas purifying device for an internal combustion engine as described in any one of the first to third aspects, the retaining member is disposed between the reduced-diameter part of the case member and the honeycomb carrier, and the retaining member is partially disposed between a part of the case member other than the reduced-diameter part and the honeycomb carrier (e.g., so as to form the receding part 13g1 recessed from the inlet-side end face 110a of the honeycomb carrier 11 as described later).

With the exhaust gas purifying device for an internal combustion engine of the above-mentioned fourth aspect, particularly in the exhaust gas purifying device for an internal combustion engine of any one of the above-mentioned first to third aspects, the retaining member is provided between the reduced-diameter part of the case member and the honeycomb carrier, and the retaining member is partially arranged between the honeycomb carrier and a part other than the reduced-diameter part of the case member, by the end thereof being recessed, etc. For this reason, while the retaining member firmly retains the honeycomb carrier at a part corresponding to the reduced-diameter part of the case member, erosion of the retaining member by exhaust gas flow can be effectively avoided by configuring so as to partially provide the retaining member at parts corresponding to other than the reduced-diameter part of the case member, in a form such that recesses the ends thereof, or the like.

According to a fifth aspect of the present invention, in the exhaust gas purifying device for an internal combustion engine as described in any one of the first to fourth aspects, the exhaust channel has a curved part (e.g., the curved part 51 described later) that curves to be connected to an upstream side of the case member, and the retaining member is not provided at a part corresponding to a connecting position between the case member and a longest outer circumferential part (e.g., the longest-outer circumferential part 51a described later) at which a length in a direction along a pipeline of the curved part is the longest.

With the exhaust gas purifying device for an internal combustion engine of the above-mentioned fifth aspect, particularly in the exhaust gas purifying device for an internal combustion engine of any one of the above-mentioned first to fourth aspects, the exhaust channel has a curved part that curves to be connected to an upstream side of the case member, and the retaining member is not provided to a part corresponding to a connecting position between the case member and a longest outer circumferential part at which the length in a direction following a pipeline of this curved part is the longest. For this reason, at the place at which the flow speed of the exhaust gas flow is relatively fast, it avoids the retaining member from being exposed to the exhaust gas flow, and the occurrence of erosion of this retaining member is much more effectively suppressed.

According to a sixth aspect of the present invention, in the exhaust gas purifying device for an internal combustion engine as described in any one of the first to fifth aspects, the case member includes: a case sloped part (e.g., the case sloped part 62a, 62b described later) or a case stepped part formed to follow the sloped part or stepped part of the honeycomb carrier; and a convex part (e.g., the convex part 62c described later) that is formed in the vicinity of the case sloped part or the case stepped part and at which an inner face thereof is convex towards an outer side.

With the exhaust gas purifying device for an internal combustion engine of the above-mentioned sixth aspect, particularly in the exhaust gas purifying device for an internal combustion engine of any one of the above-mentioned first to fifth aspects, upon the sloped part or case stepped part being formed in the case, the drifting of material is accommodated by the above-mentioned convex part, whereby it is possible to avoid wrinkles, etc. occurring at parts other than this convex part.

According to the present invention, it is possible to realize an exhaust gas purifying device for an internal combustion engine that can make retaining of the carrier by way of a retaining member reliable while minimizing the loss in effective volume of a carrier.

BRIEF DESCRIPTION OF THE DRAWINGS

FIGS. 11A-11C are diagrams showing a method for manufacturing the exhaust gas purifying devices of the fifth to seventh embodiments of the present invention;

DETAILED DESCRIPTION OF THE INVENTION

Hereinafter, the present invention will be clarified by describing in detail the embodiments of the present invention while referencing the drawings.

First Embodiment

Figure 1:
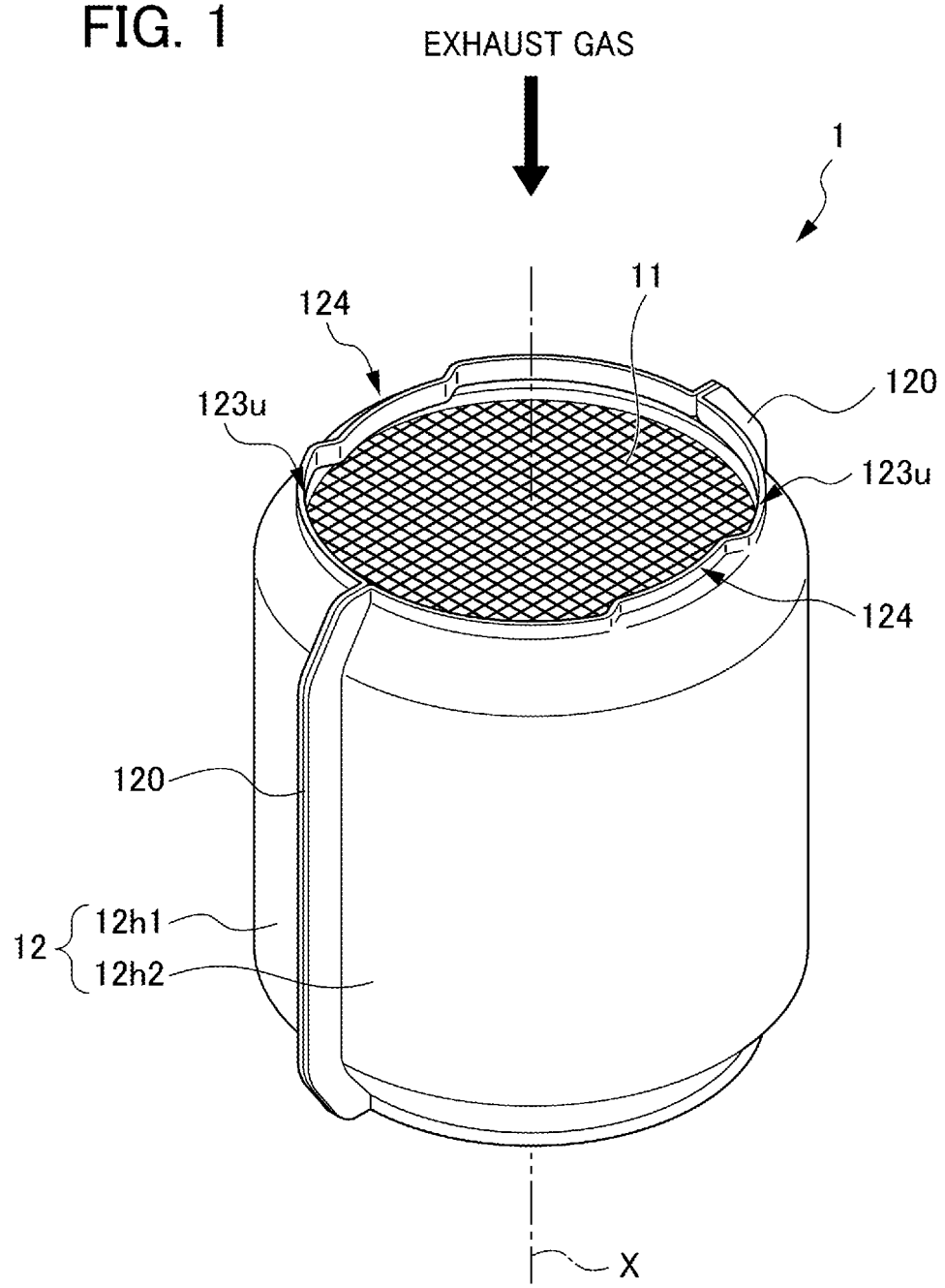
FIG. 1 is a perspective view of an exhaust gas purifying device for an internal combustion engine according to a first embodiment of the present invention.

FIG. 1 is a perspective view of an exhaust gas purifying device for an internal combustion engine according to the first embodiment of the present invention. An exhaust gas purifying device 1 for an internal combustion engine according to the present embodiment is a gasoline particulate filter (hereinafter referred to as "GPF") that is provided in the exhaust pipe of an internal combustion engine that is not illustrated (hereinafter referred to as "engine"), and collects particulate matter (hereinafter referred to as "PM") in the exhaust gas flowing through the exhaust pipe.

The exhaust gas purifying device 1, in one embodiment thereof, is provided immediately under a gasoline engine that is not illustrated, in the exhaust pipe extending downwards along the lateral side on the vehicle forward side of the gasoline engine. In other words, the exhaust gas purifying device 1 is provided in the exhaust pipe in a state with the flow direction of exhaust gas pointing downwards.

As shown in FIG. 1, the exhaust gas purifying device 1 includes a honeycomb carrier 11 and a case member 12.

The honeycomb carrier 11 has a plurality of cells serving as the flowpath of exhaust gas that penetrate and extend from an inlet-side end face 110a to an outlet-side end face 110b for exhaust gas, which are the respective end faces of one and the other in the central axis X direction (refer to FIG. 3), and a porous barrier wall that divides to form these cells.

The honeycomb carrier 11 is a columnar shape with a circular cross section. However, it is acceptable so long as the honeycomb carrier is columnar; for example, the radial-direction cross-section may be an ellipse or a shape having a plurality of arcs.

The shape of each cell is a square columnar shape with a square cross-section; however, it may be a polygonal shape, for example.

The honeycomb carrier 11 is formed from a porous fire-resistant ceramic consisting of cordierite. The honeycomb carrier 11 consisting of cordierite is obtained by integrally molding by extrusion molding, followed by firing. During firing, a crust is formed simultaneously. Therefore, since the honeycomb carrier 11 of the present embodiment has the outer-circumferential side face thereof covered by a crust, catalyst will not leak out from the outer-circumferential side face in the catalyst loading process, and exhaust gas will not leak out from the outer-circumferential side face during use.

The pore (micropore) size and porosity (microporosity) of the honeycomb carrier 11 are set as appropriate within a range in which the barrier wall thereof functions as filter media filtering out PM in the exhaust gas.

An exhaust gas purifying catalyst for purifying the exhaust gas is loaded on the honeycomb carrier 11. More specifically, a three-way catalyst that purifies HC, CO and NOx in exhaust gas is loaded on the honeycomb carrier 11 of the present embodiment. As the three-way catalyst, one containing at least one noble metal among Pt, Pd and Rh is preferably used.

The case member 12 is a cylindrical shape having a toric cross-section. However, it is acceptable so long as the case member 12 is tubular according to the shape of the honeycomb carrier 11; for example, the radial cross-section may be an ellipse or a shape having a plurality of arcs.

This case member 12 is configured from metal such as SUS, for example.

The case member 12 is a clamshell-type case member configured from case halves 12h1, 12h2 divided in the circumferential direction along the central axis X direction thereof (vertical direction in FIG. 1). As shown in FIG. 1, the case member 12 is integrally formed by bringing face to face the case halves 12h1, 12h2 which were divided into two, and welding at the extended parts 120, 120.

It should be noted that the extended parts 120, 120 are formed by bringing face to face and welding parts made in a flange shape by outwardly bending the edge in the circumferential direction of each case half.

Next, the exhaust gas purifying device for an internal combustion engine according to the first embodiment of the present invention will be described in further detail by referencing FIGS. 2 to 4 together with FIG. 1.

Figure 2:
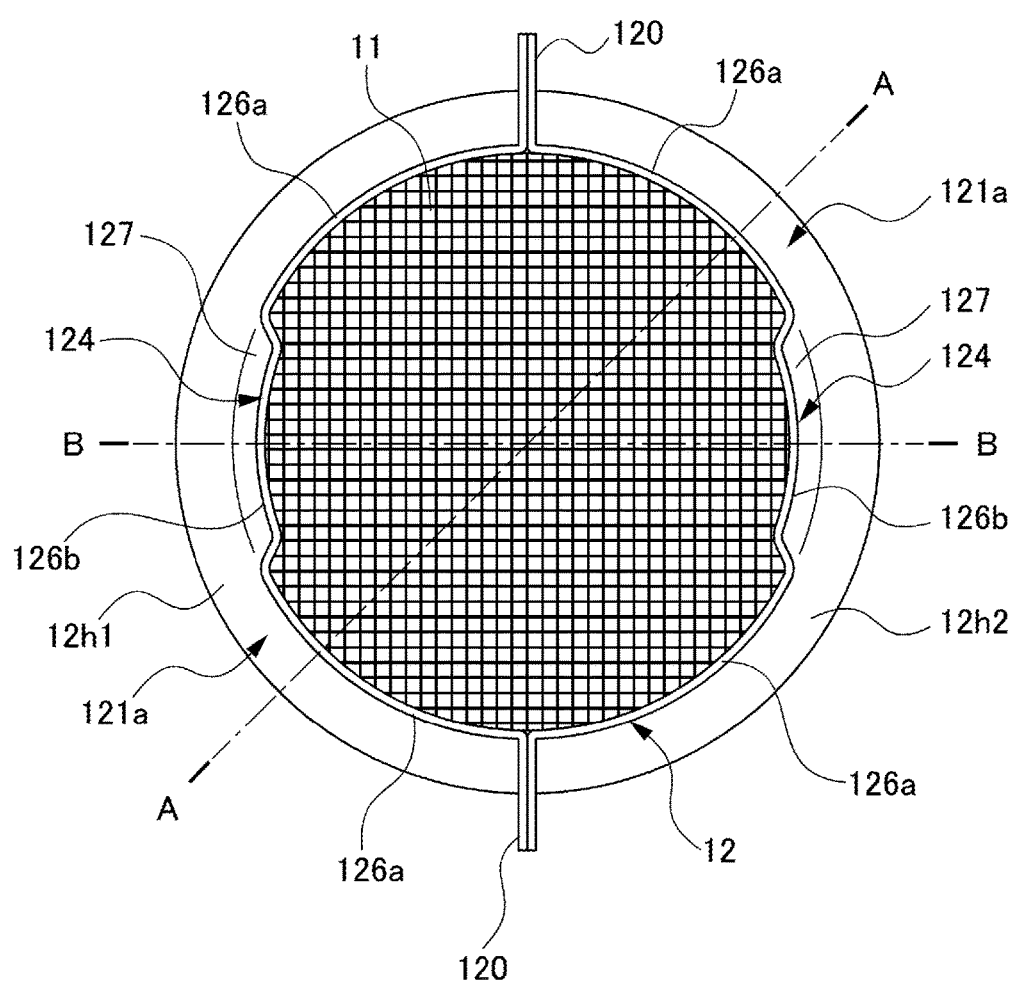
FIG. 2 is a plan view seen from an inflow direction of exhaust gas in the exhaust gas purifying device of FIG. 1.

FIG. 2 is a plan view seen from the inflow direction for exhaust gas of the exhaust gas purifying device in FIG. 1.

Figure 3:
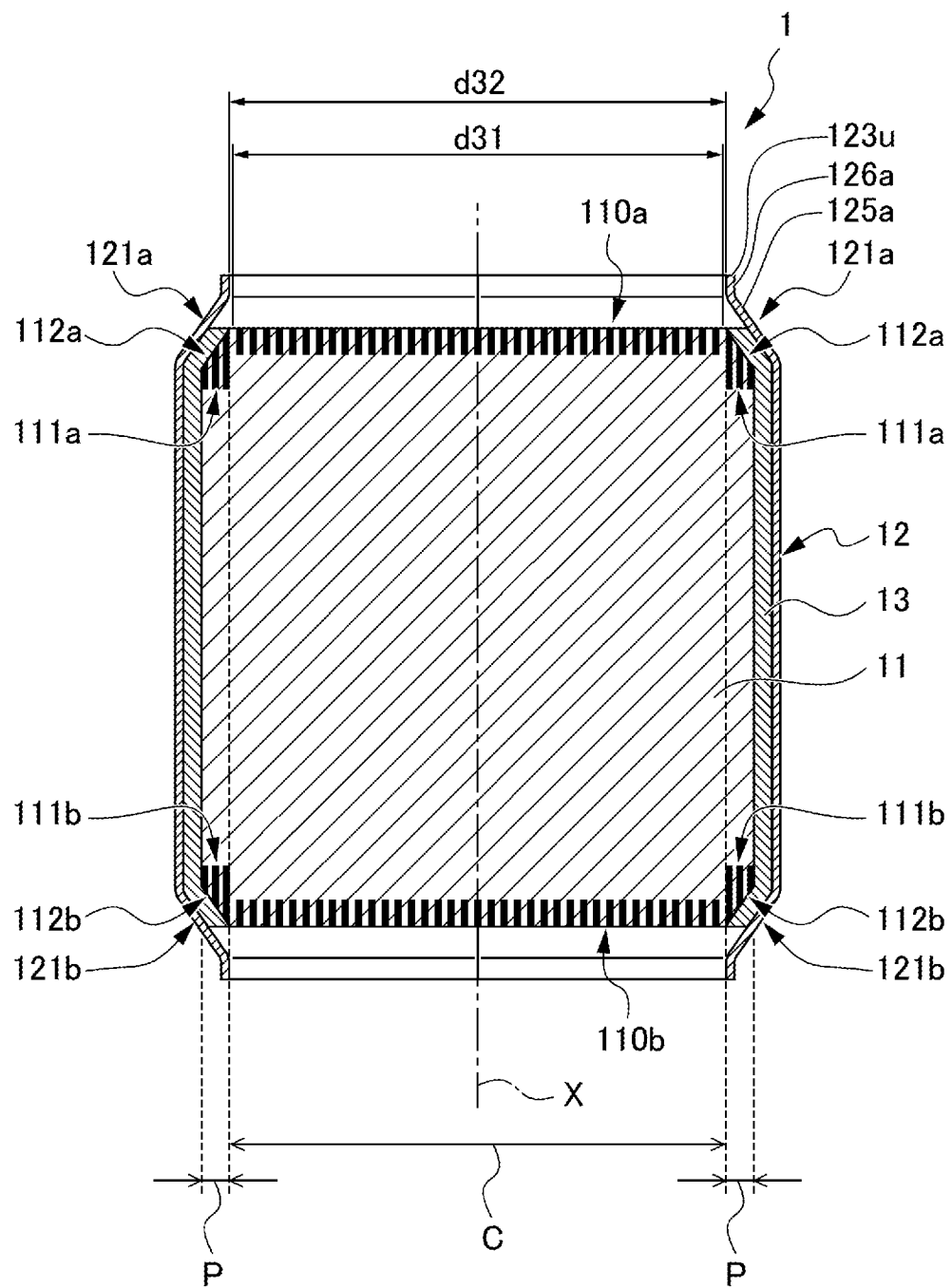
FIG. 3 is a axial-direction cross-sectional view in a case of cutting along the line A-A of the exhaust gas purifying device of FIG. 2.

In addition, FIG. 3 is an axial-direction cross-sectional view in the case of cutting along the line A-A of the exhaust gas purifying device of FIG. 2.

Figure 4:
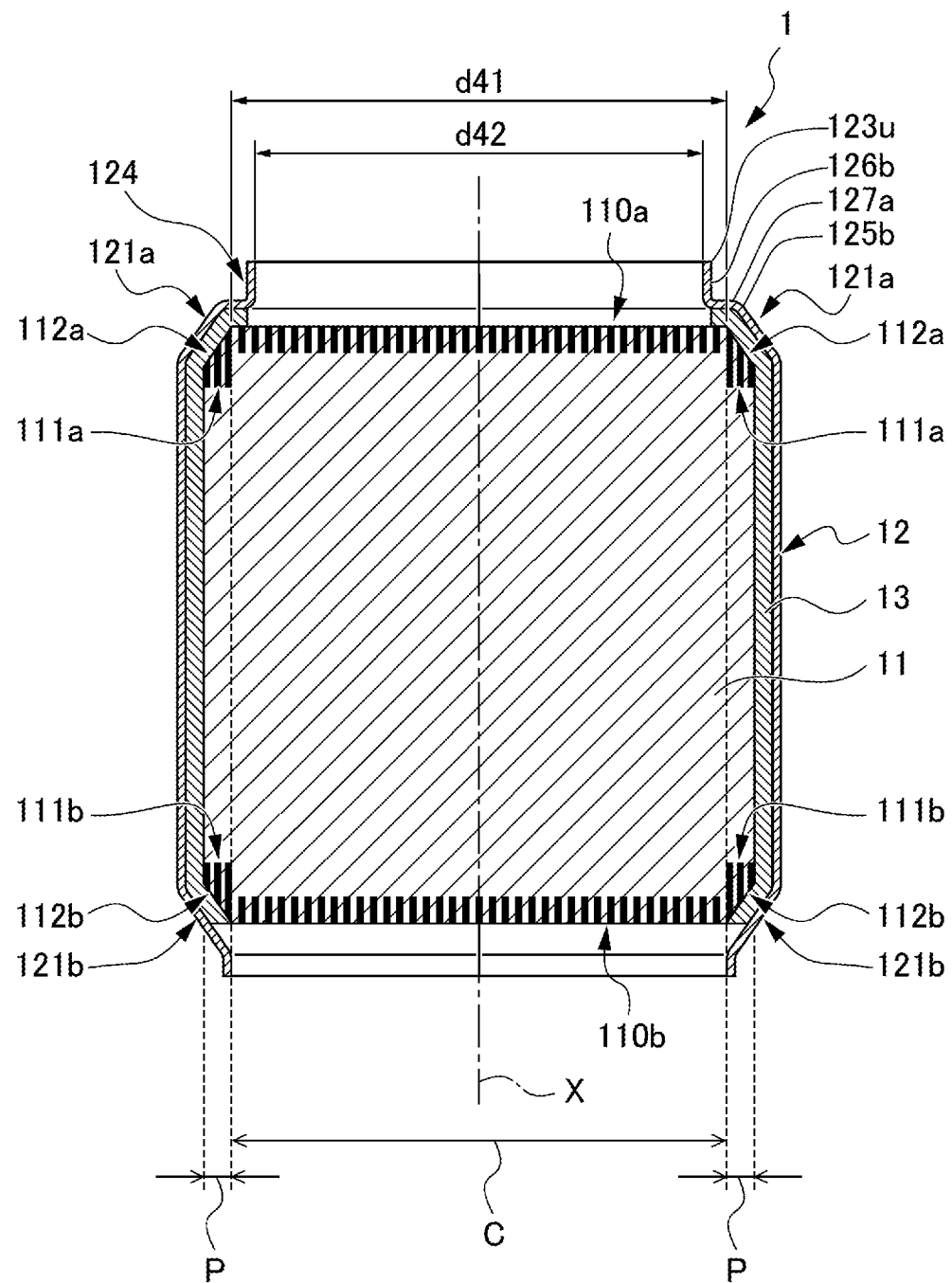
FIG. 4 is a axial-direction cross-sectional view in a case of cutting along the line B-B of the exhaust gas purifying device of FIG. 2.

Furthermore, FIG. 4 is a axial-direction cross-sectional view in a case of cutting along the line B-B of the exhaust gas purifying device of FIG. 2

In the respective drawings of FIGS. 1 to 4, the same reference symbols are appended to corresponding parts.

As in the illustrations, the honeycomb carrier 11 having a profile that is a roughly columnar shape is housed inside of the case member 12 via the retaining member 13. In more detail, the honeycomb carrier 11 is housed inside the case member 12 in a state in which the mat-like retaining member 13 is wrapped around along substantially the whole circumference of the entirety of the outer-circumferential side face including the sloped parts 112a, 112b thereof.

The sloped parts 112a, 112b are configured from sloped flat faces that slope in a direction in which the length in the central axis X direction of an outer-circumferential edge of the honeycomb carrier 11 becomes smaller. In other words, the sloped parts 112a, 112b are formed to slope in a direction in which the cross-sectional area orthogonal to the central axis X direction increases as approaching the outer-circumferential edge side thereof, at both ends in the central axis X direction of the outer-circumferential part P of the honeycomb carrier 11. Therefore, the honeycomb carrier 11 is formed so that both ends in the central axis X direction gradually reduce in diameter to an outer side in the central axis X direction.

In addition, the case member 12 has a shape following the profile of the honeycomb carrier 11, and both end sides in the central axis X direction, i.e. inlet end side and outlet end side relative to the flow of exhaust gas, each become the sloped parts 121a, 121b forming the slope in a cross-sectional view so as to gradually reduce as approaching towards the end parts. In each embodiment of the present invention, although the sloped part 121a adopts various forms and has a characteristic for every respective mode thereof, this will be described later.

The honeycomb carrier 11 housed in the aforementioned such case member 12 is retained inside the case member 12 by the sloped parts 112a, 112b thereof being caught in the inner walls of the sloped parts 121a, 121b of the case member 12 via the retaining member 13.

The retaining member 13 is interposed between the outer circumferential side face of the honeycomb carrier 11 and the inner wall of the case member 12, and retains the honeycomb carrier 11 inside of the case member 12. As the retaining member 13, a material is used that has fire resistance, vibration resistance and sealability. More specifically, in addition to alumina fiber, silica fiber, alumina-silicate fiber, ceramic fiber such as ceramic glass fiber, a metal mesh or the like can be used.

In the present embodiment, as is easily understood by referencing FIG. 2 and FIG. 4 in particular, in the case member 12, the reduced-diameter part 124 at which the inside diameter d42 of a case terminal part, i.e., in this case, the terminal part 123u on the inlet side for exhaust (hereinafter abbreviated as inlet-side terminal part 123u as appropriate), is smaller than the outside diameter 241 of the inlet-side end face 110a of the honeycomb carrier 11 is provided to at least one portion.

In this case, as is easily understood by referencing FIG. 2, the reduced-diameter parts 124 are provided along arc-shaped regions of about 60 degrees around the center among the circumferential edge spanning every 180 degrees around the axis X of the terminal part 123u of each half 12h1 and 12h2 of the case member 12.

In addition, in the present embodiment, as is easily understood by referencing FIG. 2 and FIG. 3, in a portion excluding the region in which the reduced-diameter part 124 of the terminal part 123u of each half 12h1 and 12h2 is provided, the inside diameter d32 of an inlet-side terminal part 123u of the case member 12 is at least the size of the outside diameter d31 of the inlet-side end face 110a of the honeycomb carrier 11. It should be noted that, in the example of FIG. 3, the above-mentioned inside diameter d32 is of an extent slightly larger than the above-mentioned outside diameter d31.

Next, the sloped part 121a of the case member 12 will be described in further detail.

This sloped part 121a differs in shape between the sloped part 121a related to the portion of FIG. 3 described previously, and the sloped part 121a related to the portion of FIG. 4.

The sloped part 121a in FIG. 3 is formed to include a sloped face part 125a formed to slope in the central axis X direction towards the leading end so as to follow the outer circumferential face of the sloped part 112a of the honeycomb carrier 11 via the retaining member 13, and a parallel face part 126a that connects with the sloped face part 125a, and curves to extends in parallel with the central axis X. The inside diameter d32 of this parallel face part 126a is the inside diameter d32 of the inlet-side terminal part 123u of the case member 12 described earlier, and the size thereof is slightly larger than the outside diameter d31 of the inlet-side end face 110a of the honeycomb carrier 11.

On the other hand, the sloped part 121a in FIG. 4 is formed to include a sloped face part 125b formed by sloping in the central axis X direction towards the leading end so as to follow the outer circumferential face of the sloped part 112a of the honeycomb carrier 11 via the retaining member 13; a flat part 127a that connects with the sloped face part 125b and curves in a direction orthogonal to the central axis X, and a parallel face part 126b that connects with the flat part 127a, curves and extends in parallel to the central axis X. These parallel face parts 126 form the reduced-diameter part 124s forming a partial expanse of 60 degrees each in an arc shape as described earlier. The flat part 127a is formed as mentioned above; therefore, it resulting is substantially parallel to the inlet-side end face 110a of the honeycomb carrier 11. In addition, the insider diameter d42 of the parallel face part 126b is the inside diameter d42 of the inlet-side terminal part 123u of the case member 12 described earlier, and in the present embodiment, the size of this inside diameter d42 is smaller than the outside diameter (in present example, d41=d31) of the inlet-side end face 110a of the honeycomb carrier 11.

Next, the structure of the honeycomb carrier 11 will be explained in further detail by referencing FIG. 3 and FIG. 4.

In FIG. 3 and FIG. 4, the black portions indicate portions sealed by sealing agent.

As shown in FIG. 3 and FIG. 4, the honeycomb carrier has a characteristic of the structures of the outer circumferential part and central part in the radial direction thereof (left-right direction in FIG. 1, which is direction orthogonal to the central axis X direction) differing.

More specifically, the honeycomb carrier 11 has outer-circumferential sealing parts 111a, 111b formed by the opening parts of the plurality of cells being sealed to a predetermined depth in the central axis X direction in the outer circumferential part (radial outer circumferential part P) of both end faces 110a, 110b in the central axis X direction thereof. These outer-circumferential sealing parts 111a, 111b are formed over the entire circumference.

The width in the radial direction (radial length of radial outer-circumferential part P) of these outer-circumferential sealing parts 111a, 111b is preferably no more than 10 mm. If the width in the radial direction of the outer-circumferential sealing parts 111a, 111b is no more than 10 mm, the function as a filter of the honeycomb carrier 11 will not be impaired.

The outer-circumferential sealing parts 111a, 111b, the adjacent openings of the plurality of cells are alternately sealed. In other words, the outer-circumferential sealing parts 111a, 111b form a wall flow structure in which a cell having an exhaust gas inlet-side opening part sealed, and a cell having an outlet-side opening part sealed are alternately adjacent in a checkered state.

It should be noted that, as the sealing agent in the outer-circumferential sealing parts 111a, 111b, a conventional, known sealing agent made by mixing a cordierite powder and an adhesive or the like can be used.

The length in the central axis X direction of the sloped parts 112a, 112b described earlier is preferably no more than 10 mm. In addition, the width in the radial direction of the sloped parts 112a, 112b is preferably no more than 30% of the diameter of the honeycomb carrier 11. In addition, the slope angle of the sloped parts 112a, 112b is preferably 15 to 80 degrees. By satisfying these requirements, the sloped parts 112a, 112b come to be reliably caught in the inner walls of the sloped parts 121a, 121b of the case member 12 via the retaining member 13, a result of which the honeycomb carrier 11 is reliably retained inside of the case member 12.

Herein, the depth of sealing of the outer-circumferential sealing parts 111a, 111b is set to deeper than the depth of sealing of a radial central part C. It thereby becomes easy to form the sloped parts 112a, 112b inside the outer-circumferential sealing parts 111a, 111b.

In addition, the honeycomb carrier 11, the opening parts of cells at the central part (radial central part C) of both end faces 110a, 110b in the central axis X direction are alternately sealed. In other words, the honeycomb carrier 11 is a filter having a wall-flow part in which cells having an exhaust gas inlet-side opening part sealed and cells having an outlet-side opening part sealed are alternately adjacent in a checkered state.

In addition, in the honeycomb carrier 11, the aforementioned three-way catalyst is only loaded in the radial central part C, and the three-way catalyst is not loaded in the radial outer-circumferential part P. In other words, the wasteful use of catalyst is avoided by not loading the three-way catalyst on the radial outer-circumferential part P through which exhaust gas hardly flows, and by loading the three-way catalyst only in the radial central part C through which the exhaust gas mostly flows.

In the exhaust gas purifying device of the first embodiment of the present invention with the aforementioned such configuration, the exhaust flow is constricted by the reduced-diameter part 124, and does not easily impinge on the retaining member 13; therefore, erosion of the retaining member 13 by the exhaust gas flow is suppressed. In addition, retaining of the honeycomb carrier 11 inside the case member 12 is reliably carried out.

In addition, at the reduced-diameter part 141 of the case member 12, the flat part 127a that is substantially parallel with the inlet-side end face 110a of the honeycomb carrier 11 is provided to the sloped part 112a. For this reason, the exhaust gas flow is much more reliably constricted, and the erosion of the retaining member 13 by exhaust gas flow is effectively suppressed. In addition, retaining of the honeycomb carrier 11 inside of the case member 12 is much more reliably carried out.

Furthermore, in portion excluding the reduced-diameter parts 124 forming partial expanses of 60 degrees each in an arc shape as mentioned above (FIG. 3), the inside diameter d32 of the case terminal part is a size of at least the outside diameter d31 of the inlet-side end face 110a of the honeycomb carrier 11; therefore, the effective volume of the honeycomb carrier 11, i.e. effective portion of the loaded catalyst, is ensured to be large, and the exhaust gas purifying ability improves.

Second Embodiment

Figure 5:
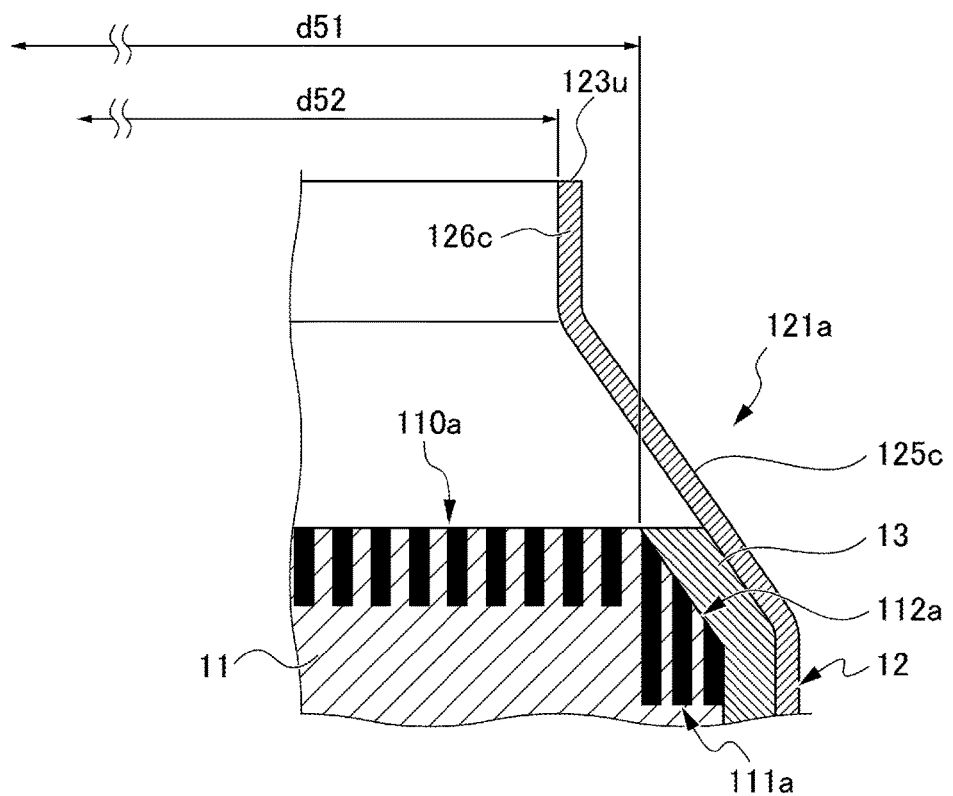
FIG. 5 is an axial-direction partial cross-sectional view of an exhaust gas purifying device according to a second embodiment of the present invention.

FIG. 5 is an axial-direction partial cross-sectional view of an exhaust gas purifying device according to a second embodiment of the present invention.

In FIG. 5, the same reference symbols are assigned to corresponding parts in the respective drawings of FIGS. 1 to 4 described earlier.

In the second embodiment of FIG. 5, the sloped part 121a of the case member 12 is configured as follows.

In other words, the sloped part 121a of the case member 12 made to include the sloped circumferential face part 125c and a tubular part 126c connected with this is formed over the entire circumference of the inlet-side terminal part 123u.

In more detail, the sloped part 121a of the case member 12 is configured to include the sloped circumferential face part 125c that is the circumferential face of cone shape formed to slope in the central axis X direction towards the leading end so as to follow the outer circumferential face of the sloped part 112a of the honeycomb carrier 11 via the retaining member 13; and the tubular part 126c that connects with the sloped circumferential face part 125c, and curves to extend in parallel to the central axis X.

The inside diameter d52 of the tubular part 126c is the inside diameter of the inlet-side terminal part 123u of the case member 12 described earlier. The size of the inside diameter d52 reduces in diameter to be narrower than the outside diameter d51 of the inlet-side end face 110a of the honeycomb carrier 11.

The second embodiment of FIG. 5 is similar to the first embodiment described earlier by referencing FIGS. 1 to 4, in other points.

In the exhaust gas purifying device of the second embodiment of the present invention with the aforementioned such configuration, the sloped part 121a of the case member 12 made to include the sloped circumferential face part 125c and the tubular part 126c connecting with this is formed over the entire circumference of the inlet-side terminal part 123u, and the inside diameter d52 of the tubular part 126c is made narrower than the outside diameter d51 of the inlet-side end face 110a of the honeycomb carrier 11. For this reason, the exhaust gas flow is constricted, and erosion of the retaining member 13 is suppressed.

Third Embodiment

Figure 6:
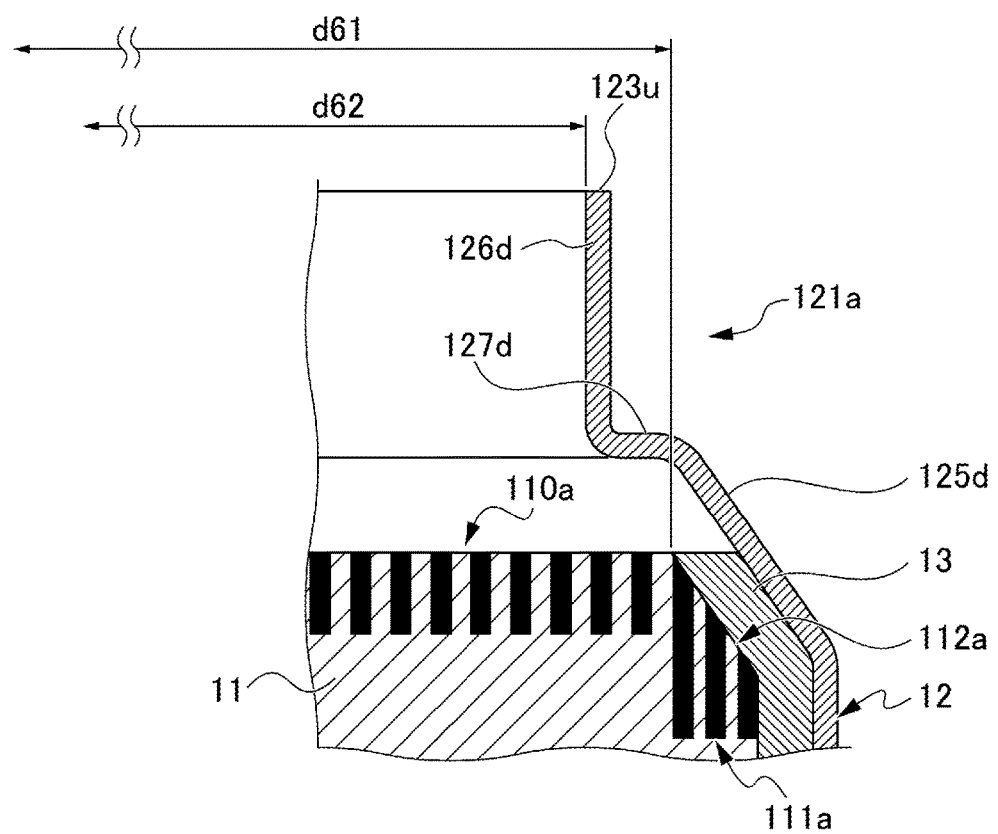
FIG. 6 is an axial-direction partial cross-sectional view of an exhaust gas purifying device according to a third embodiment of the present invention.

FIG. 6 is an axial-direction partial cross-sectional view of an exhaust gas purifying device according to a third embodiment of the present invention.

In FIG. 6, the same reference symbols are assigned to corresponding parts in the respective drawings of FIGS. 1 to 4 described earlier.

In the third embodiment of FIG. 6, the case member 12 thereof is configured as follows. In other words, a sloped part 121a of the case member 12 made to include a sloped circumferential face part 125d of the case member 12, a flat part 127d connecting with this sloped circumferential face part 125d, and a tubular part 126a connecting with this flat part 127d is formed over the entire circumference of the inlet-side terminal part 123u.

In more detail, the sloped part 121a of the case member 12 is formed to include the sloped circumferential face part 125d formed to sloped in the central axis X direction towards the leading end so as to follow the outer circumferential face of the sloped part 112a of the honeycomb carrier 11 via the retaining member 13, the flat part 127d that is connected with the sloped circumferential face part 125d and curved in a direction orthogonal to the central axis X, and the tubular part 126d that connects with the flat part 127d, and curves to extend in parallel with the central axis X. Since the flat part 127d is formed as mentioned above, it resultingly is substantially parallel to the end face of the inlet-side end face 110a of the honeycomb carrier 11.

The inside diameter d62 of the tubular part 126d is the inside diameter of the inlet-side terminal part 123u of the case member 12 described earlier. The size of the inside diameter d62 is made narrower than the outside diameter d61 of the inlet-side end face 110a of the honeycomb carrier 11.

The third embodiment of FIG. 6 is similar to the first embodiment described earlier by referencing FIGS. 1 to 4 in the other points.

With the exhaust gas purifying device of the third embodiment of the present invention with the aforementioned such configuration, since the flow of the inlet exhaust gas and outlet exhaust gas in the honeycomb carrier 11 is effectively constricted to avoid from impinging on the retaining member 13 by the action of the flat part 127d in particular, the exhaust gas is very effectively prevented from eroding the retaining member 13.

Fourth Embodiment

Figure 7:
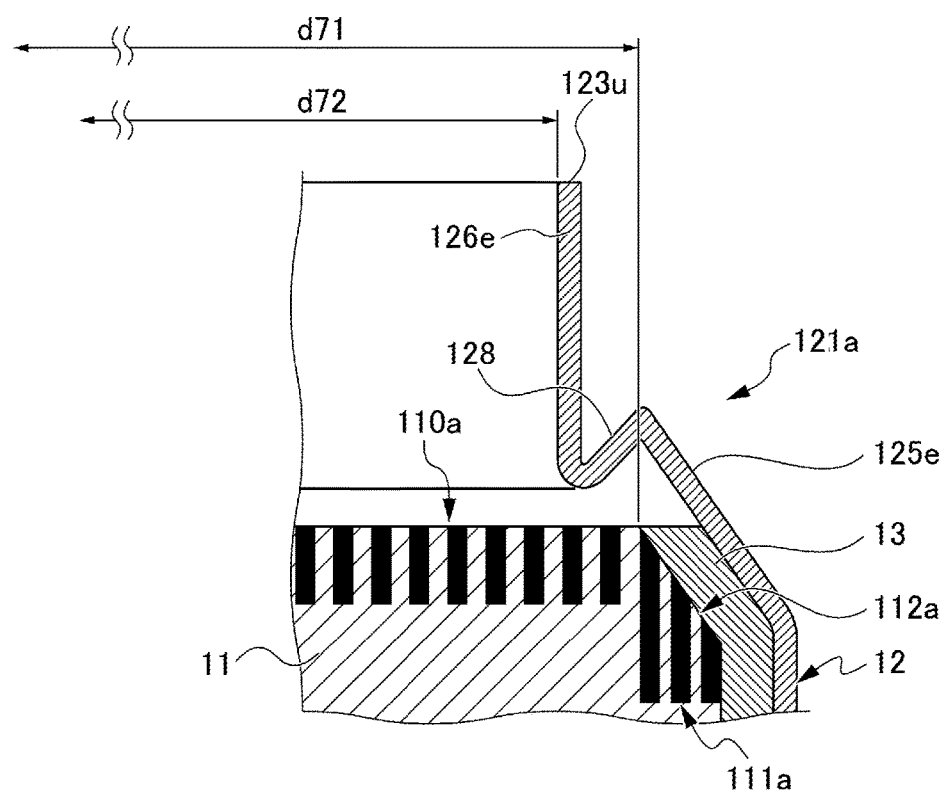
FIG. 7 is an axial-direction partial cross-sectional view of an exhaust gas purifying device according to a fourth embodiment of the present invention.

FIG. 7 is an axial-direction partial cross-sectional view of an exhaust gas purifying device according to a fourth embodiment of the present invention.

In FIG. 7, the same reference symbols are assigned to corresponding parts in the respective drawings of FIGS. 1 to 4 described earlier.

In the fourth embodiment of FIG. 7, the sloped part 121a of the case member 12 is configured as follows.

In other words, the sloped part 121a of the case member 12 is configured to include a sloped circumferential face part 125e of the case member 12, a constricting part 128 connecting with this sloped circumferential face part 125e, and a tubular part 126e connecting with this constricting part 128, and the sloped part 121a of such an embodiment is formed over the entire circumference of the inlet-side terminal part 123u.

In more detail, the sloped part 121a of the case member 12 is formed to include the sloped circumferential face part 125e formed to slope in the central axis X direction towards the leading end so as to follow the outer circumferential face of the sloped part 112a of the honeycomb carrier 11 via the retaining member 13, the constricting part 128 curved angularly in a direction (i.e. returning direction) towards the inlet-side end face 110a of the honeycomb carrier on the extension of the sloped circumferential face part 125e, and the tubular part 126e that connects with the constricting part 128, and curves angularly in a direction separating from the inlet-side end face 110a to extend in parallel to the central axis X.

The inside diameter d72 of the tubular part 126e is the inside diameter of the inlet-side terminal part 123u of the case member 12 described earlier. The size of this inside diameter d72 is made narrower than the outside diameter d71 of the inlet-side end face 110a of the honeycomb carrier 11.

The fourth embodiment of FIG. 6 is similar to the first embodiment described earlier by referencing FIGS. 1 to 4 in the other points.

With the exhaust gas purifying device of the fourth embodiment of the present invention with the aforementioned such configuration, the sloped part 121a of the case member 12 made to include the sloped circumferential face part 125e, the constricting part 128 connecting with this, and the aforementioned tubular part 126e is formed over the entire circumference of the inlet-side terminal part 123u, and the inside diameter of the tubular part 126e is made narrower than the outside diameter d71 of the inlet-side end face 110a of the honeycomb carrier 11.

For this reason, the exhaust gas flow is constricted, and erosion of the retaining member 13 is suppressed.

Furthermore, erosion of the retaining member 13 by the exhaust gas flow is much more effectively suppressed by the constricting part 128.

Fifth Embodiment

Figure 8A:
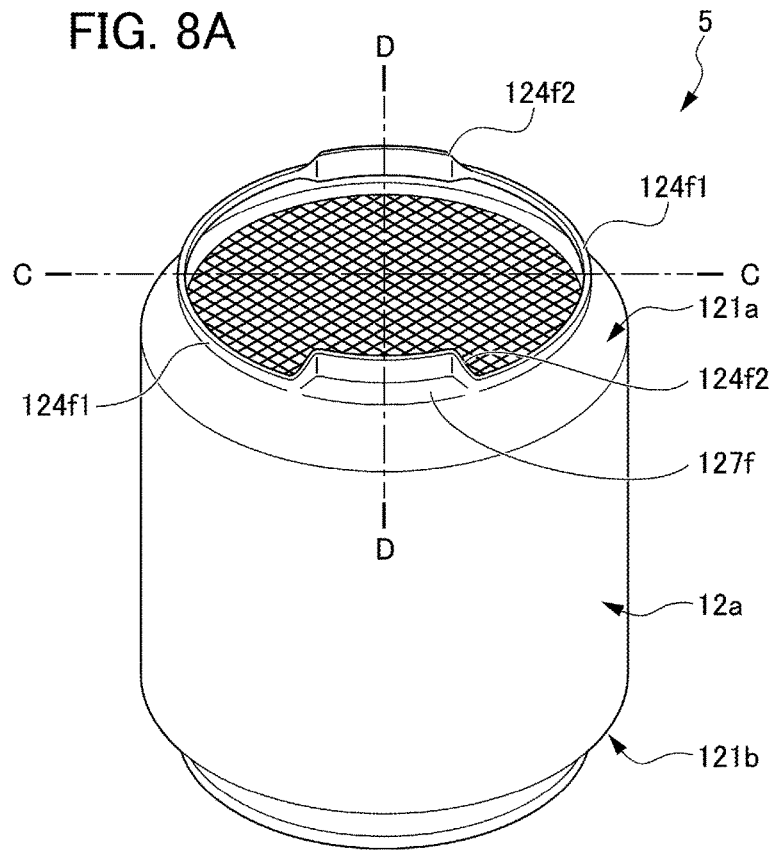
FIGS. 8A-8C provide views showing an exhaust gas purifying device according to a fifth embodiment of the present invention, with FIG. 8A being a perspective view, FIG. 8B being a cross-sectional view along the line C-C, and FIG. 8C being a cross-sectional view along the line D-D.
Figure 8B:
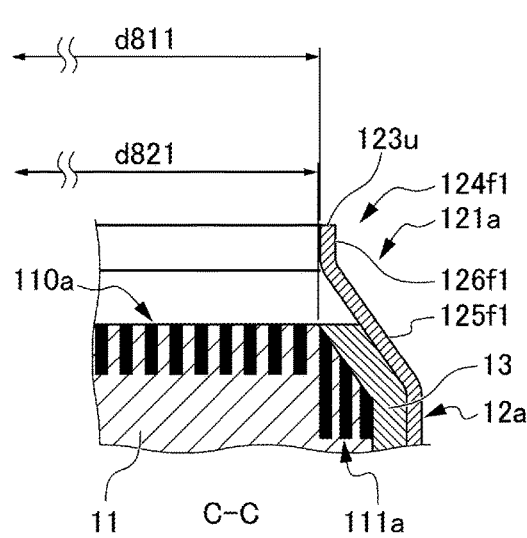
Figure 8C:
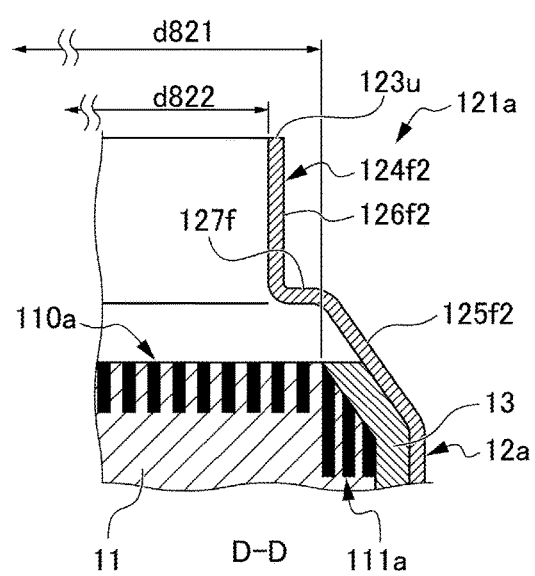

FIGS. 8A-8C provide views showing an exhaust gas purifying device according to a fifth embodiment of the present invention, with FIG. 8A being a perspective view, FIG. 8B being a cross-sectional view along the line C-C, and FIG. 8C being a cross-sectional view along the line D-D.

In FIGS. 8A-8C, the same reference symbols are assigned to corresponding parts in the respective drawings of FIGS. 1 to 4 described earlier.

With the exhaust gas purifying device 5 according to the fifth embodiment of FIGS. 8A-8C. the case member 12a is not a clamshell shape formed by dividing as two halves as in the first embodiment described earlier, but rather is made by canning by shrink molding the ends while housing the honeycomb carrier 11 by way of drawing. For this reason, there is no extension part for joining both halves as in FIG. 1 and FIG. 2.

As is easily understood by referencing FIGS. 8A-8C, the reduced-diameter part 124f2 at which the inside diameter d82 of the inlet-side terminal part 123u is smaller than the outside diameter d821 of the inlet-side end face 110a of the honeycomb carrier 11 is provided in at least one portion. In the present example, the reduced-diameter parts 124f2 are provided over arc-shaped regions with an opening angle on the order of 60 degrees each including the line D-D at the center, around the central axis of the columnar honeycomb carrier 11, as in FIG. 1 and FIG. 2 described earlier.

On the other hand, at a portion (portion including the aforementioned cross-section along line C-C) excluding the region in which the aforementioned reduced-diameter part 124f2 is provided (portion including the aforementioned cross-section along the line D-D), the inside diameter d811 of the inlet-side terminal part 123u of the case member 12a is at least the size of the outside diameter d821 of the inlet-side end face 11a of the honeycomb carrier 11. It should be noted that, in the examples of FIGS. 8A-8C, the above-mentioned inside diameter d811 is of an order slightly larger than the above-mentioned outside diameter d821.

Also in the fifth embodiment of FIGS. 8A-8C, the case member 12a has a shape following the profile of the honeycomb carrier 11, and both ends in the central axis direction of the columnar honeycomb carrier 11, i.e. the inlet-side end and outlet-side end related to the flow of exhaust gas respectively, form the sloped parts 121*a*, 121*b* that gradually reduce in diameter as approaching the ends.

The sloped part 121*a* relative to the cross-section along the line C-C of FIG. 8B is formed to include: the sloped face part 125*f*1 formed to slope in the central axis direction of the honeycomb carrier 11 towards the leading end so as to follow the outer circumferential face of the sloped part 112*a* of the honeycomb carrier 11 via the retaining member 13; and a parallel face part 126*f* that connects with the sloped face part 125*f*1 and curves to extend in parallel with the above-mentioned central axis. The inside diameter d811 of this parallel face part 126*f*1 is the inside diameter of the inlet-side terminal part 123*u* of the case member 12 described earlier, and the size thereof is slightly larger than the outside diameter d821 of the inlet-side end face 110*a* of the honeycomb carrier 11.

On the other hand, the sloped part 121*a* related to the cross-section along the line D-D of FIG. 8C is formed to include: the sloped face part 125*f*2 formed to slope in the central axis direction of the honeycomb carrier 11 towards the leading end so as to follow the outer circumferential face of the sloped part 112*a* of the honeycomb carrier 11 via the retaining member 13; a flat part 127*f* that connects with the sloped face part 125*f*2 and curves in a direction orthogonal to the above-mentioned central axis; and a flat face part 126*b* that connects with the flat part 127*f* and curves to extend in parallel with the above-mentioned central axis. Since the flat part 127*a* is formed as mentioned above, it is resultingly substantially parallel to the inlet-side end face 110*a* of the honeycomb carrier 11. In addition, the inside diameter d822 of the parallel face end 126*f*2 is the inside diameter of the inlet-side terminal part 123*u* of the case member 12 described earlier, and in the present embodiment, the size of this inside diameter d822 is smaller than the outside diameter d821 of the inlet-side end face 110*a* of the honeycomb carrier 11.

In this fifth embodiment as shown in FIGS. 8A-8C, the retaining member 13 interposed between the honeycomb carrier 11 and the case member 12 is arranged in a form such that substantially matches with the inlet-side end face 110*a* of the honeycomb carrier 11, without the end face of the exhaust gas inlet side thereof projecting or receding from the inlet-side end face 110*a* of the honeycomb carrier 11.

In the exhaust gas purifying device of the fifth embodiment of the present invention with the aforementioned such configuration, the exhaust gas flow is constricted by the sloped face part 125*f*2 forming the reduced-diameter part 124*f*2 in FIGS. 8A and 8C, and it becomes difficult to impinge on the retaining member 13; therefore, erosion of the retaining member 12 is suppressed. In addition, retaining of the honeycomb carrier 11 inside the case member 12 is reliably carried out.

In addition, the flat part 127*f* that is substantially parallel with the inlet-side end face 110*a* of the honeycomb carrier 11 is provided to the sloped face part 125*f*2. For this reason, the exhaust gas flow is much more reliably constricted, and erosion of the retaining member 113 is effectively suppressed. In addition, the retaining of the honeycomb carrier 11 inside of the case member 12 is much more reliably carried out.

Furthermore, in a portion excluding the reduced-diameter part 124 forming a partial expanse of about 60 degrees in an arc shaped as mentioned above in FIG. 8A, the inside diameter d811 of the parallel face part 126*f*1 assuming the inside diameter of this case terminal part is slightly larger than the outside diameter d821 of the inlet-side end face 110*a* of the honeycomb carrier 11. For this reason, the effective volume of the honeycomb carrier 11, i.e. effective portion of loaded catalyst, is ensured to be large, and thus the exhaust gas purifying ability improves.

Sixth Embodiment

Figure 9A:
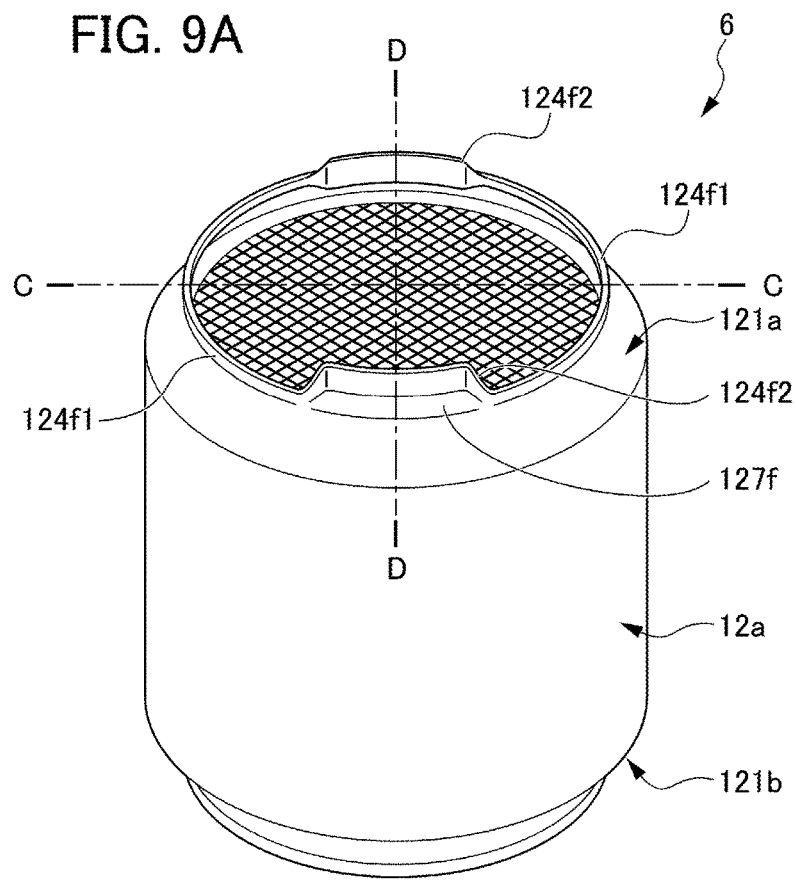
FIGS. 9A-9C provide views showing an exhaust gas purifying device according to a sixth embodiment of the present invention, with FIG. 9A being a perspective view, FIG. 9B being a cross-sectional view along the line C-C, and FIG. 9C being a cross-sectional view along the line D-D.
Figure 9B:
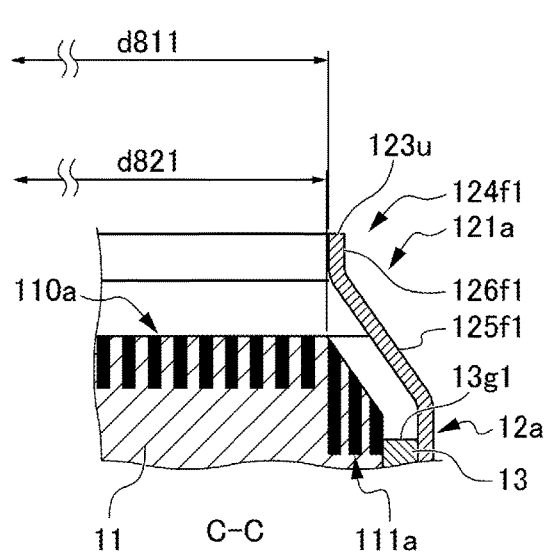
Figure 9C:
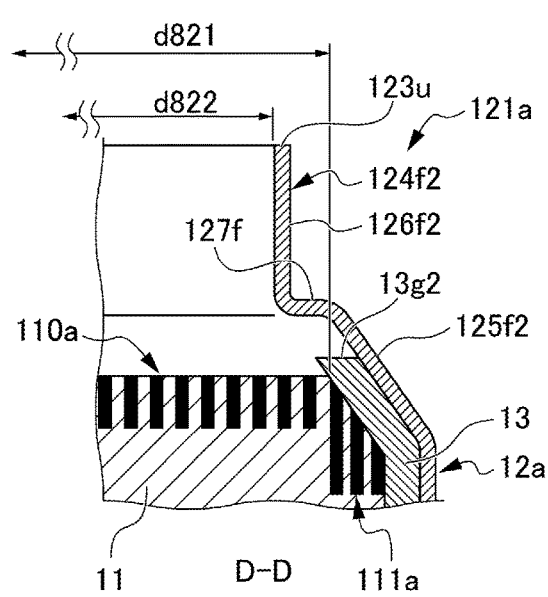

FIGS. 9A-9C provide views showing an exhaust gas purifying device according to a sixth embodiment of the present invention, with FIG. 9A being a perspective view, FIG. 9B being a cross-sectional view along the line C-C, and FIG. 9C being a cross-sectional view along the line D-D.

In FIGS. 9A-9C, the same reference symbols are assigned to corresponding parts with FIGS. 8A-8C described earlier.

Also in the exhaust gas purifying device 6 according to the sixth embodiment in FIGS. 9A-9C, the case member 12*a* is made by canning by shrink molding the ends while housing the honeycomb carrier 11 by way of drawing.

For the sixth embodiment of FIGS. 9A-9C, as is easily understood by comparing the reference symbols with FIGS. 8A-8C, the sixth embodiment shares configurations in summary with the fifth embodiment described earlier; however, it has a difference in the installation mode of the retaining member 13 interposed between the honeycomb carrier 11 and the case member 12*a*.

In other words, in the sixth embodiment of FIGS. 9A-9C, for a portion including the cross-section along line C-C in FIG. 9B, in which the inside diameter d811 of the inlet-side terminal part 123*u* of the case member 12*a* is larger than the outside diameter d821 of the inlet-side end face 110*a* of the honeycomb carrier 11, the retaining member 13 forms a receding part 13*g*1 in which the end face of the exhaust gas inflow side thereof is recessed from the inlet-side end face 110*a* of the honeycomb carrier 11.

On the other hand, for the portion including the cross-section along the line D-D of FIG. 9C in which the inside diameter d822 of the inlet-side terminal part 123*u* of the case member 12*a* is smaller than the outside diameter d821 of the inlet-side end face 110*a* of the honeycomb carrier 11, the retaining member 13 forms a protruding part 13*g*2 at which the end face of the exhaust gas inlet side thereof protrudes from the inlet-side end face 110*a* of the honeycomb carrier 11.

With the exhaust gas purifying device of the sixth embodiment of the present invention with the aforementioned such configuration, in addition to the functions and effects of the exhaust gas purifying device of the fifth embodiment described earlier, due to the aforementioned such receding parts 13*g*1 being formed, erosion of the retaining member 13 by exhaust gas flow is much more effectively suppressed at this portion.

Furthermore, for the portion related to the cross-section along the line D-D of the retaining member 13 in FIG. 9C, since the aforementioned protruding part 13*g*2 is formed, retaining of the honeycomb carrier 11 by the retaining member is remarkable in particular at this portion. Therefore, even if the receding part 13*g*1 is partially formed, retaining of the honeycomb carrier 11 by the retaining member 13 will be fully carried out as a whole.

Seventh Embodiment

Figure 10A:
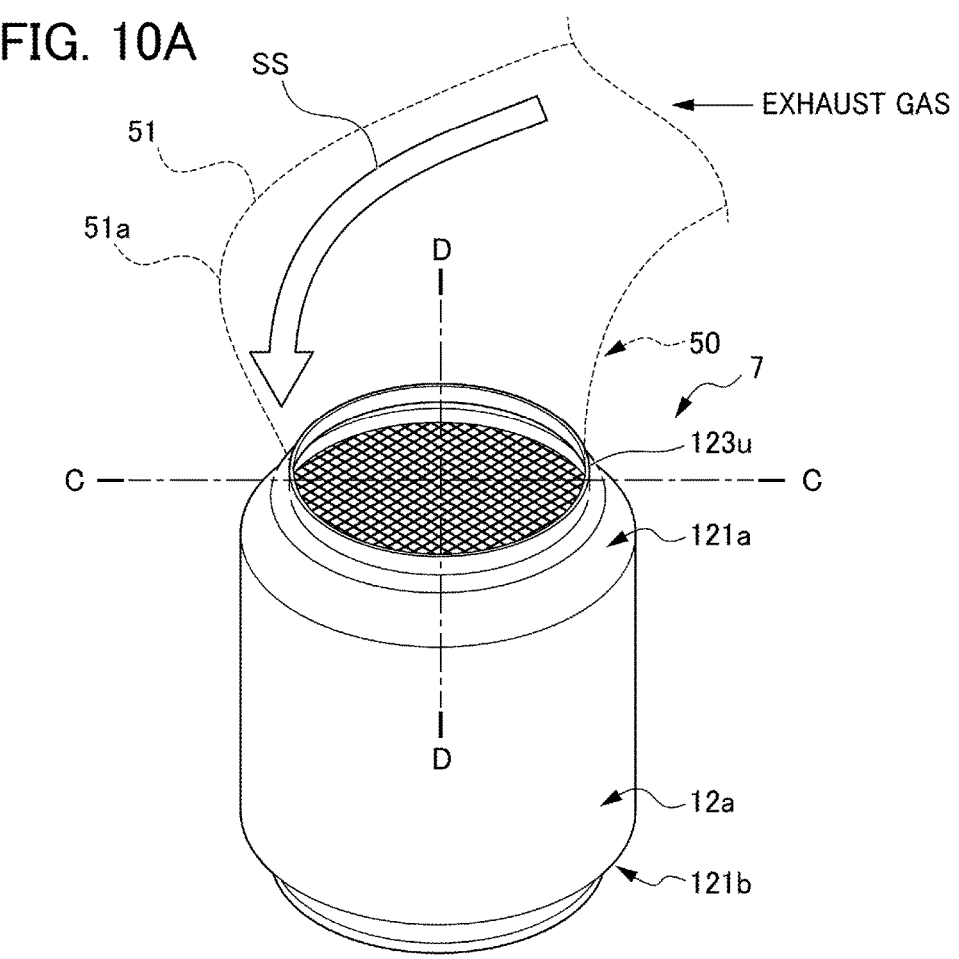
FIGS. 10A-10C provide views showing an exhaust gas purifying device according to a seventh embodiment of the present invention, with FIG. 10A being a perspective view, FIG. 10B being a cross-sectional view along the line C-C, and FIG. 10C being a cross-sectional view along the line D-D.
Figure 10B:
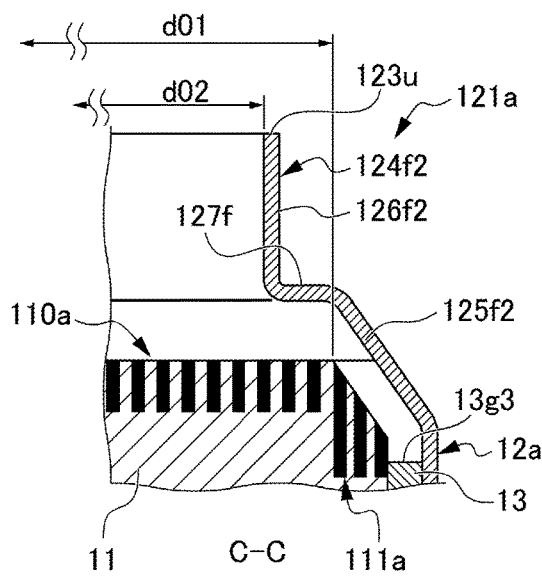
Figure 10C:
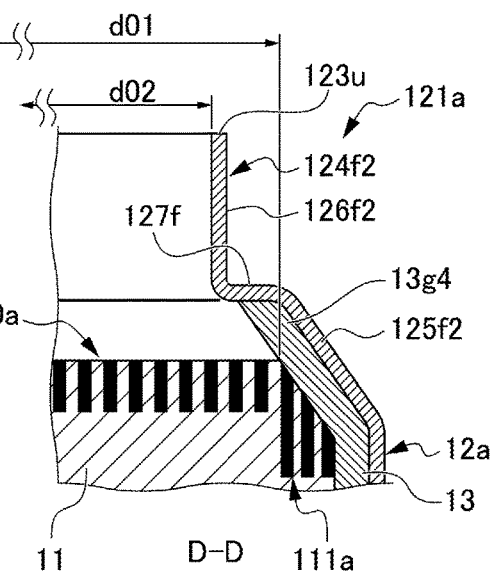

FIGS. 10A-10C provide views showing an exhaust gas purifying device according to a seventh embodiment of the present invention, with FIG. 10A being a perspective view, FIG. 10B being a cross-sectional view along the line C-C, and FIG. 10C being a cross-sectional view along the line D-D.

In FIGS. 10A-10C, the same reference symbols are assigned to corresponding parts with FIGS. 9A-9C described earlier.

With the exhaust gas purifying device 7 according to the seventh embodiment of FIGS. 10A-10C, the exhaust pipe 50 is connected to the inlet-side terminal part 123u of the case member 12a, and this exhaust pipe 50 in particular has a curved part 51 in which a portion bulging out is formed closer to one side (left side in example of illustration) of the cross-section along the line C-C of the case member 12a. The outer circumferential side of the curved part 51 of the exhaust pipe 50 forms a longest-outer circumferential part 51a at which the length in a direction along the pipeline is the longest.

Since the exhaust pipe 50 has such a curved part 51, the exhaust gas flow on the interior towards the inlet-side terminal part 123u of the case member 12a produces the rapid current SS of the arrow illustration at which the flowrate is relatively fast at a portion along the aforementioned longest-outer circumferential part 51a.

As is easily understood by comparing the reference symbols of FIGS. 10A-10C and FIGS. 9A-9C, the seventh embodiment has shared configurations in summary with the sixth embodiment described earlier; however, it differs in the mode of installation of the retaining member 13 interposed between the honeycomb carrier 11 and the case member 12a.

In addition, the case member 12a has a shape of the sloped part 121a on the inlet-side terminal part 123u thereof that is uniform over the entire circumference, as is evident even when comparing FIG. 10B and FIG. 10C.

In other words, in the seventh embodiment of FIGS. 10A-10C, the inside diameter d02 of the inlet-side terminal part 123u of the case member 12a is smaller than the outside diameter d01 of the inlet-side end face 110a of the honeycomb carrier 11, over the entire circumference of the inlet-side terminal part 123u.

On the other hand, in the portion of the sloped part 121a including the cross-section along the line C-C in FIG. 10B, in the region at which a part near the curved part 51 on the exhaust pipe 50 is connected and the rapid flow SS of the arrow illustration of the exhaust gas flow flows into as mentioned above, the retaining member 13 near this region forms a receding part 13g3 at which the end face on the exhaust gas inlet side thereof recedes from the inlet-side end face 110a of the honeycomb carrier 11.

On the other hand, in the portion of the sloped part 121a including the cross-section along the line D-D in FIG. 10C and in the portion of the sloped part 121a including the cross-section along the line C-C of FIG. 10B, at a region in which the rapid current SS of arrow illustration in the exhaust gas flow is not flowing thereinto, the retaining member 13 in the vicinity of this region forms a protruding part 13g4 at which the end face on the exhaust gas inlet side thereof protrudes from the inlet-side end face 110a of the honeycomb carrier 11.

With the exhaust gas purifying device of the seventh embodiment of the present invention with the aforementioned such configuration, at a corresponding part of the case member 12a to which the extension part from the longest-outer circumferential part 51a that is on the outer circumferential side of the curved part 51 and at which the length in a direction following the pipeline is the longest is connected, the retaining member 13 forms a receding part 13g3 at which the end face on the exhaust gas inlet side thereof recedes from the inlet-side end face 110a of the honeycomb carrier 11; therefore, the retaining member 13 is not provided within a space due this recess.

For this reason, at the place at which the flow speed of the exhaust gas flow is relatively fast, i.e. at the region at which the rapid current SS of the arrow illustration flows in, it avoids the retaining member from being exposed to the exhaust gas flow, and the occurrence of erosion of this retaining member is much more effectively suppressed.

Furthermore, in a portion of the sloped part 121a including the cross-section along the line D-D in FIG. 10C and a portion of the sloped part including the cross-section along the line C-C in FIG. 10B, at a region in which the rapid current SS of the exhaust gas flow does not flow thereinto, the retaining member 13 in the vicinity of this region forms a protruding part 13g4 at which the end face on an exhaust gas inlet side thereof protrudes from the inlet-side end face 110a of the honeycomb carrier 11; therefore, retaining of the honeycomb carrier 11 by the retaining member 13 is firmly carried out remarkably in particular at this portion. Therefore, even if the receding part 13g3 is partially formed, retaining of the honeycomb carrier 11 by the retaining member 13 is fully carried out as a whole.

Although the exhaust gas purifying device of the first embodiment to the seventh embodiment of the present invention have been described in detail above, as the honeycomb carrier 11 in each of these embodiments, one in which the outer circumferential portion is sealed by a sealing agent is applied. However, the honeycomb carrier 11 applied to the present invention is not limited to that of the form having portions sealed in this way. In other words, a honeycomb carrier not including the aforementioned such sealed portions may be applied.

FIGS. 11A-11C are views showing a method for manufacturing the exhaust gas purifying devices of the fifth to seventh embodiments of the present invention.

As shown in FIG. 11A, the retaining member 13 is wrapped around the honeycomb carrier 11 over the entirety of the outer circumference thereof, then, as shown in FIG. 11B, the honeycomb carrier 11 wrapped by the retaining member 13 is arranged at an intermediate part in the axial direction of the tubular body 12P of metal (e.g., SS, etc.) that is the basis of the case member 12a.

In the state of FIG. 11B, canning is performed by conducting a shrinking process on parts of the tubular body 12P facing the inlet-side end face 110a and outlet-side end face 110b of the honeycomb carrier 11.

As a result thereof, the tubular body 12P is molded into the case member 12a as mentioned earlier. It is possible to stably and reliably retain the honeycomb carrier 11 by the retaining member 13 being interposed between the inner faces of the sloped parts 121a, 121b of the case member 12a formed in this way and the sloped parts 112a, 112b of the honeycomb carrier 11.

Eighth Embodiment

Figure 12:
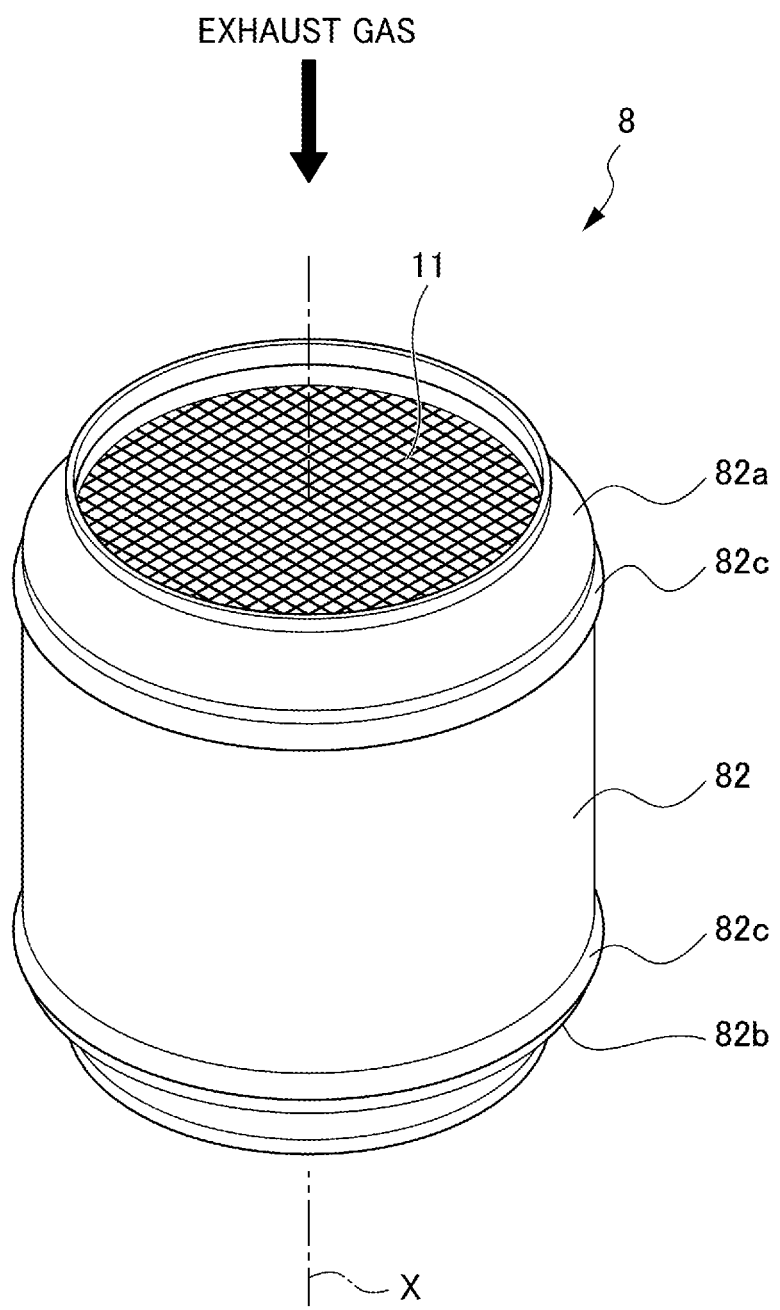
FIG. 12 is a perspective view of an exhaust gas purifying device for an internal combustion engine according to an eighth embodiment of the present invention.
Figure 13:
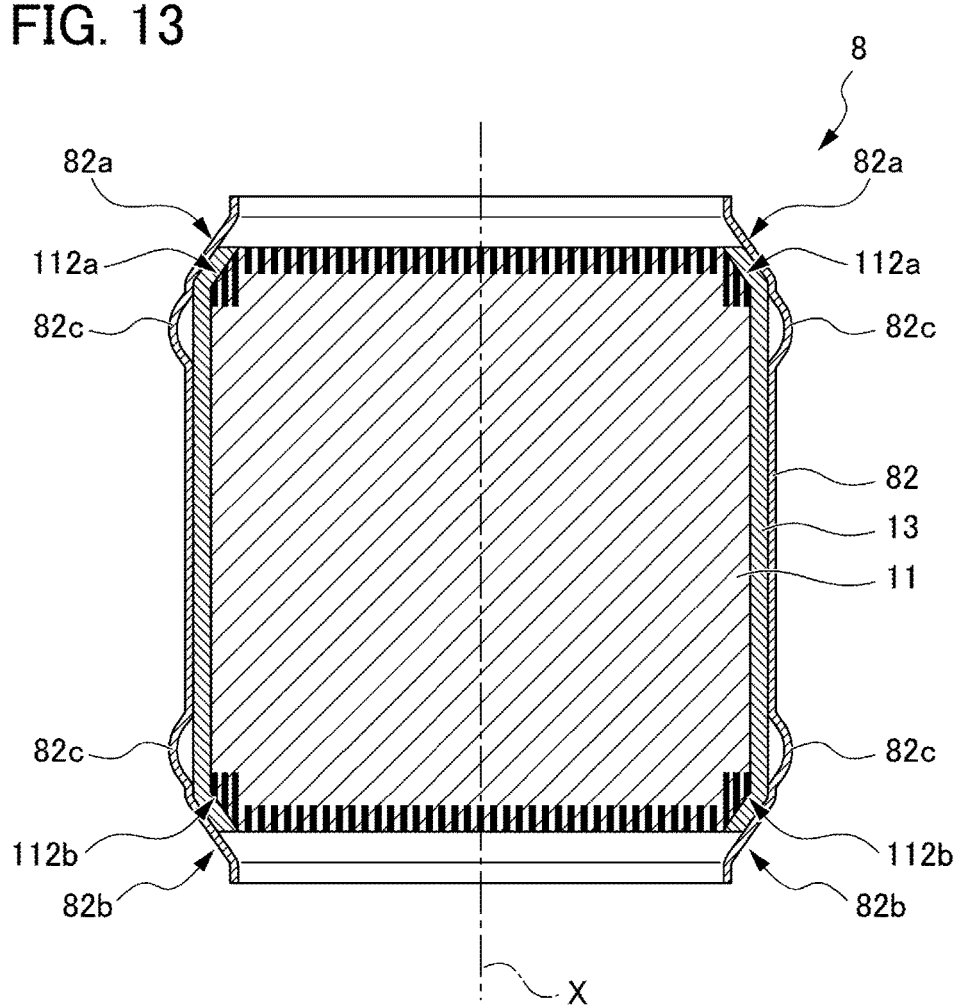
FIG. 13 is an axial-direction cross-sectional view of the exhaust gas purifying device according to the eighth embodiment of the present invention.

FIG. 12 is a perspective view of an exhaust gas purifying device 8 for an internal combustion engine according to an eighth embodiment of the present invention. FIG. 13 is an axial-direction cross-sectional view of the exhaust gas purifying device 8 according to the eighth embodiment of the present invention.

As shown in FIG. 12 and FIG. 13, the exhaust gas purifying device 8 according to the present embodiment is the same configuration as the first embodiment, except for the configuration of the case member 82 differing compared to the exhaust gas purifying device 1 according to the first embodiment.

The case member 82 of the present embodiment differs from the clamshell-type case member 12 of the first embodiment, and is a case member of so-called shrink type formed by reducing the diameter at both ends in the central axis X direction of the cylindrical case member (exhaust gas inlet-side end and outlet-side end).

This case member 82 includes case sloped parts 82a, 82b formed to follow the sloped parts 112a, 112b of the honeycomb carrier 11, similarly to the case member 12 of the first embodiment. In other words, the case sloped parts 82a, 82b in which sloped faces sloping in a direction that gradually reduces in diameter as approaching an opening side of the case member 82 (exhaust gas inlet side or outlet side) are formed are provided at both ends in the central axis X direction of the case member 82.

In addition, as shown in FIG. 12 and FIG. 13, the case member 82 includes the convex parts 82c, 82c formed in the vicinity of the case sloped parts 82a, 82b and in which the inner face thereof is convex to the outer side.

These convex parts 82c, 82c are each formed along the entire circumference extending in the circumferential direction, in the vicinity of an opposite side from the case sloped parts 82a, 82b than the opening side of the case member (i.e. inner side in central axis S direction of honeycomb carrier 11). In addition, these convex parts 82c, 82c are formed to protrude to the outer side from the outer face of the case member 82 so that the inner faces thereof are convex to the outer side.

The thickness of the convex parts 82c, 82c is preferably at least 3 mm. So long as the thickness of the convex parts 82c, 82c is within this range, it is possible to let free the material that drifts upon molding the case sloped parts 82a, 82b as described later.

In addition, the height of the convex parts 82c, 82c is preferably at least 3 mm and no more than 20 mm. So long as the height of the convex parts 82c, 82c is within this range, it is possible to let free the material the drifts upon molding the case sloped parts 82a, 82b described later.

Herein, the case member 82 having the case sloped parts 82a, 82b is produced as follows, for example.

First, to inside the cylindrical case member prior to forming the case sloped parts 82a, 82b, the honeycomb carrier 11 around which the retaining member 13 is completely wrapped around the entire circumference of the entire outer circumferential side face thereof is inserted. Next, the case sloped parts 82a, 82b are formed by reducing the diameter of both ends in the central axis X direction of the case member 82 by pressing by way of press molding from the outer face side thereof. The case member 82 having the case sloped parts 82a, 82b is thereby produced.

Herein, with the press molding performed upon forming the case sloped parts, since the case member is a cylindrical shape, it is not possible to push the press die against the case member from only an outer face side, i.e. only from one side. For this reason, conventionally, the case member cannot sufficiently follow the mold surface of the press mold, and molding of the R part, etc. in particular is difficult, and thus high molding precision of the case sloped parts has not been obtained.

In addition, since the case sloped part is not a shape sufficiently following the shape of the sloped part of the honeycomb carrier, the retaining of the honeycomb carrier may become insufficient. In addition, by the drift of material being biased to the periphery of the case sloped part (material bunching), wrinkles may form at the case sloped part. Furthermore, as a result of wrinkles forming also in the retaining member at the periphery of these sloped parts, and the specific pressure of the retaining member on the honeycomb carrier becoming excessive, the honeycomb carrier may be damaged. These wrinkles remarkably occur also in an intermediate portion between the exhaust gas purifying device on the upstream side (first bed) and the exhaust gas purifying device on the downstream side (second bed) in the case member of so-called 2-bed type.

In the case of the clamshell-type case member 12 as in the first embodiment, press molding is possible prior to integrating by bringing face to face and welding the case halves 12h1, 12h2 that were divided in two. For this reason, since it is possible to press mold by pushing from both sides of the outer side and inner side of the case member 12, high molding (dimensional) precision of the case sloped parts 121a, 121b tends to be obtained.

However, in this case, positional adjustment of the honeycomb carrier 11 or retaining member 13 is difficult. In addition, pinching of the retaining member 13 tends to occur upon matching together and welding the case halves 12h1, 12h2, whereby the honeycomb carrier 11 may be damaged by the specific pressure of the retaining member 13 on the honeycomb carrier 11 becoming excessive due to pinching.

In contrast, with the present embodiment, by forming the convex parts 82c, 82c in the vicinity of the case sloped parts 82a, 82b, the material drifting upon press molding is intentionally introduced to the convex part. By causing the convex parts 82c, 82c, which do not influencing the retaining function of the honeycomb carrier 11, to be formed in the vicinity of the case sloped parts 82a, 82b, it is thereby possible to avoid wrinkles, etc. from occurring at the case sloped parts 82a, 82b and high molding (dimensional) precision of the case sloped parts 82a, 82b is obtained, a result of which it is configured to be able to resolve the above-mentioned defects.

Next, a first production method of the exhaust gas purifying device 8 according to the present embodiment will be explained.

In a housing step of the present embodiment, first, the honeycomb carrier 11 around which the retaining member 13 is wrapped over the entire outer circumferential side face thereof is inserted inside of the cylindrical case member prior to forming the case sloped parts 82a, 82b. Next, the case sloped parts 82a, 82b are formed by reducing the diameter of both ends in the central axis X direction of the case member 82 by pressing from the outer sides thereof by way of press molding. The case member 82 having the case sloped parts 82a, 82b is thereby produced.

Figure 14:
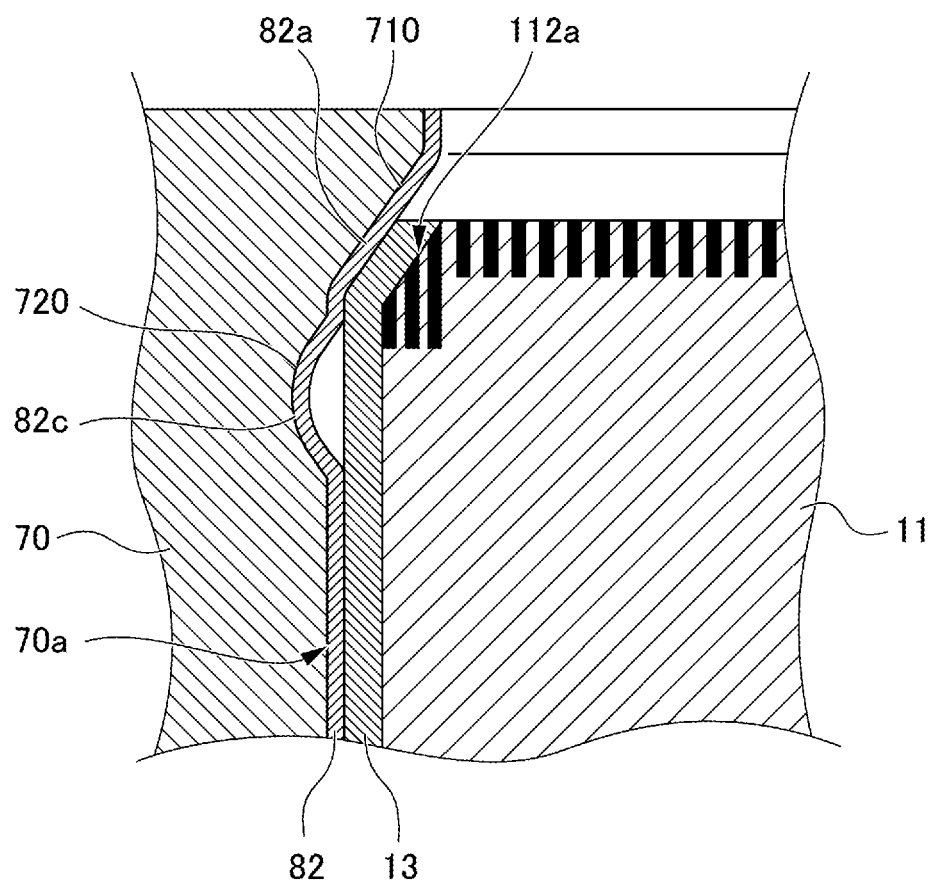
FIG. 14 is a cross-sectional view showing an aspect of forming a case sloped part of the exhaust gas purifying device according to the eighth embodiment of the present invention by way of press molding.

The housing step of the first production method will be explained in further detail by referencing FIG. 14. Herein, FIG. 14 is a cross-sectional view showing an aspect of forming the case sloped parts 82a, 82b of the exhaust gas purifying device 8 according to the present embodiment by way of press molding. In FIG. 14, only the case sloped part 82a is shown; however, the case sloped part 82b is similar.

In the first production method as shown in FIG. 14, a die 70 is used in which a die sloped part 710 of a shape following the sloped part 112a of the honeycomb carrier 11, and a concaved part 720 extending in the circumferential direction are formed on a die face 70a side of both ends in the central axis X direction of the honeycomb carrier 11 in the press molding of the case member 82.

More specifically, first, a plurality of the above-mentioned dies 70 is arranged so as to surround the cylindrical case member. In other words, the die 70 is a split mold divided in the circumferential direction. Next, the plurality of these dies 70 is made to move simultaneously towards radially inside of the honeycomb carrier 11, thereby pressing the case member from the outer surface side. When this is done, the convex part 82*c* is formed simultaneously with the case sloped part 82*a* being formed. At this time, the material drifting upon molding the case sloped part 82*a* flows into the convex part 82*c*. It is possible to avoid wrinkles, etc. from forming in the case sloped parts 82*a*, 82*b* by intentionally leading the material drifting upon press molding into the convex part by way of forming the convex part 82*c* in the vicinity of the case sloped part 82*a* in this way, and thus is configured so that high molding (dimensional) precision of the case sloped parts 82*a*, 82*b* is obtained.

Next, a second production method of the exhaust gas purifying device 8 according to the present embodiment will be explained.

The second production method of the exhaust gas purifying device 8 according to the present embodiment differs from the first production method in the point of applying spinning molding.

In the second production method, first, similarly to the first production method, the honeycomb carrier 11 around which the retaining member 13 is wrapped over the entire outer circumferential side face thereof is inserted into the cylindrical case member prior to forming the case sloped parts 82*a*, 82*b*. Next, the case sloped parts 82*a*, 82*b* and the convex parts 82*c*, 82*c* are formed by reducing the diameter of both ends in the central axis X direction of the case member 82 from the outer face sides thereof by pressing from the outer face side thereof, by way of spinning mold rather than press molding. The case member 82 having the case sloped parts 82*a*, 82*b* and the convex parts 82*c*, 82*c* is thereby produced.

The housing step of the second production method will be explained in further detail by referencing FIG. 15. Herein, FIG. 15 is a cross-sectional view showing an aspect of forming case sloped parts 82*a*, 82*b* and convex parts 82*c*, 82*c* of the exhaust gas purifying device 8 according to the eighth embodiment of the present invention by spinning molding.

Figure 15:
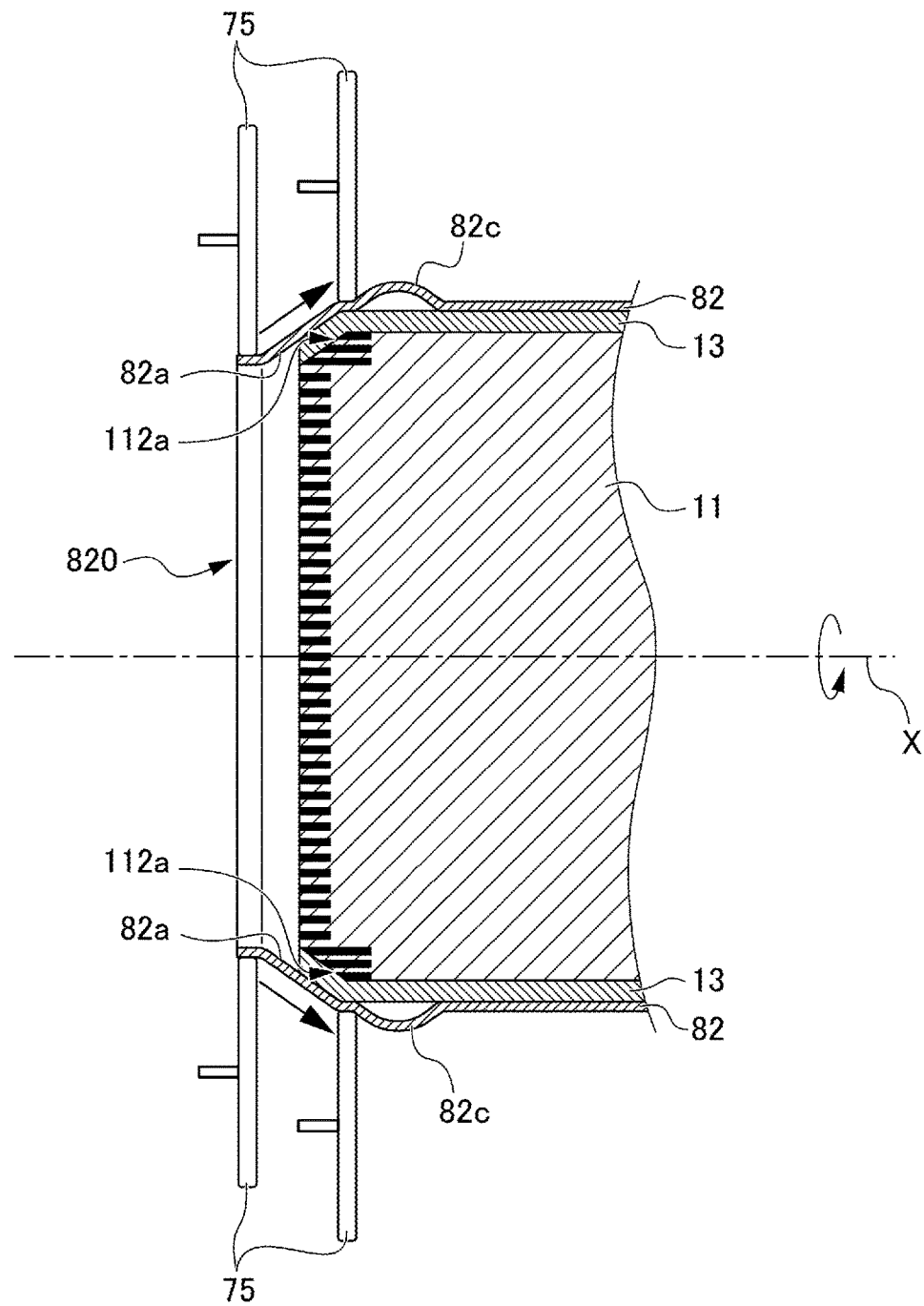
FIG. 15 is a cross-sectional view showing an aspect of forming a case sloped part of the exhaust gas purifying device according to the eighth embodiment of the present invention by way of spinning molding.

In the second production method as shown in FIG. 15, a spinning molding machine is used that includes a rotation mechanism (not illustrated) that makes the cylindrical case member holding the honeycomb carrier 11 inside rotate with the central axis X thereof as the axis of rotation, and a plurality of rollers 75 for pressing against the outer face of the case member to make plastically deform, in the spinning mold of the case member 82. It should be noted that, although the rollers 75 are used in the spinning molding machine of the present embodiment, a paddle or the like may be used in place of the roller 75.

More specifically, first, the cylindrical case member holding the honeycomb carrier 11 inside is made to rotate with the central axis X thereof as the axis of rotation, by way of the rotation mechanism that is not illustrated. At this time, if the opening end 820 of the case member is made to reduce in diameter to some extent in advance, it is preferable due to molding being facilitated.

Next, in the state rotating the above-mentioned case member, the plurality of (e.g., three) rollers 75 arranged so as to surround this opening end 820 are pressed towards the radial inner side against the outer face around the opening end 820 of the case member.

Next, in a state pressing the rollers 75 with a constant pressing force, the plurality of rollers 75 are made to move simultaneously towards the inner side in the central axis X direction (opposite direction of opening end 820). In other words, the rollers 75 are made to move from the diameter-reduced opening end 820 towards the outer circumferential side face of the case member having a larger diameter refer to arrow in FIG. 15). When this done, the case member pressed by the rollers 75 elastically deforms following the sloped part 112*a* of the honeycomb carrier 11, a result of which the case sloped part 82*a* is formed. At the same time, large wrinkles form from the excess thickness produced by the material constituting the case member being drawn upon forming the case sloped part 82*a*, and the convex part 82*c* is formed by such wrinkles ultimately.

By configuring in the above way, it is possible to avoid the wrinkles, etc. forming in the case sloped parts 82*a*, 82*b* by causing the convex parts 82*c*, 82*c*, which do not influencing the retaining function of the honeycomb carrier 11, to intentionally form in the vicinity of the case sloped parts 82*a*, 82*b*, and thus is made so that high molding (dimensional) precision of the case sloped parts 82*a*, 82*b* is obtained.

Ninth Embodiment

An exhaust gas purifying device 9 according to a ninth embodiment of the present invention is the same configuration as the eighth embodiment except for the configuration of a convex part 92*c* of the case member 92 differing compared to the exhaust gas purifying device 8 according to the eighth embodiment. Hereinafter, the configuration of the convex part 92*c* of the case member 92 will be explained by referencing FIG. 16. Herein, FIG. 16 is a perspective view of the exhaust gas purifying device 9 for an internal combustion engine according to the present embodiment.

Figure 16:
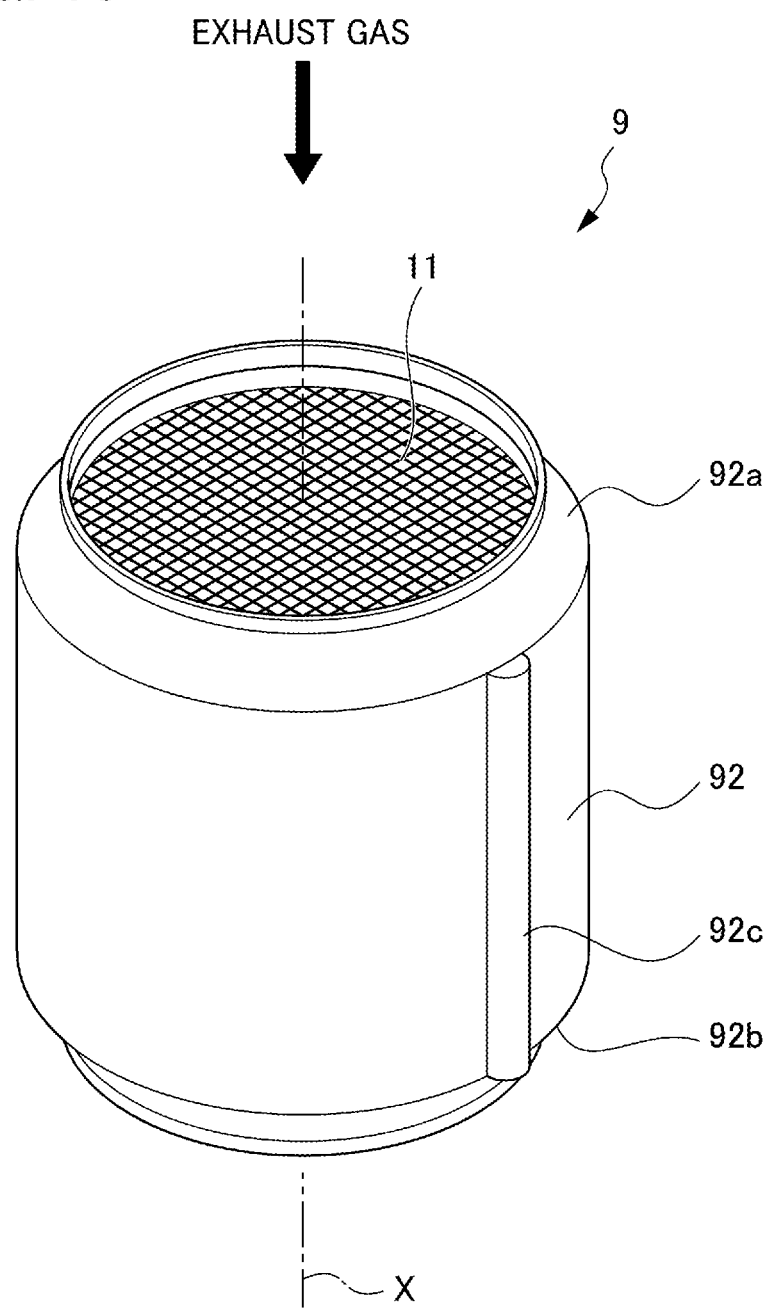
FIG. 16 is a perspective view of an exhaust gas purifying device for an internal combustion engine according to a ninth embodiment of the present invention.

As shown in FIG. 16, the convex part 92*c* of the case member 92 according to the present embodiment differs from the convex part 82*c* of the eighth embodiment extending in the circumferential direction, and the point of being formed to extend in the central axis X direction differs from the eighth embodiment.

It should be noted that only one convex part 92*c* is formed in the present embodiment; however, a plurality may be formed to be separated from each other in the circumferential direction.

As shown in FIG. 16, the convex part 92*c* extends from one case sloped part 92*a* to the other case sloped part 92*b*, and is formed up to the vicinity of the case sloped parts 92*a*, 92*b* of the case member 92. In addition, the convex part 92*c* is formed to protrude from the outer face of the case member 92 to the outside, so that the inner face thereof is convex to the outside, similarly to the convex part 82*c* of the eighth embodiment.

Next, a first production method of the exhaust gas purifying device according to the present embodiment will be explained.

The first production method of the exhaust gas purifying device 9 according to the present embodiment is identical compared to the first production method of the eighth embodiment, except for the configuration of the die applied being different.

More specifically, the die used in the housing step of the first production method according to the present embodiment has a die sloped part formed in a die face side on both ends in the central axis X direction and of a shape following the sloped part 112*a* of the honeycomb carrier 11, and a concave part formed in the die face side to straddle between the die sloped parts at both ends, and extending in the central axis X direction, and uses a split mold die that is divided into a plurality in the circumferential direction. The convex part 92c extending in the central axis X direction is thereby formed, and the same effects as the eighth embodiment are exerted.

Next, a second production method of the exhaust gas purifying device 9 according to the present embodiment will be explained.

The second production method of the exhaust gas purifying device 9 according to the present embodiment is identical compared to the aforementioned first production method according to the present embodiment, except for the point of the configuration of the die applied being different.

More specifically, the die used in the housing step of the second production method according to the present embodiment is a split mold die in which a concave part is not formed in the die face, and a plurality of these dies is arranged so that a somewhat large gap is formed at part in the circumferential direction, upon annularly arranging to be aligned in the circumferential direction. The material drifting during press molding thereby flows into such gaps, a result of which it is possible to form the convex part 92c.

Therefore, according to the present embodiment, by forming the convex part 92c in the vicinity of the case sloped parts 92a, 92b similarly to the eighth embodiment, it is possible to intentionally lead the material drifting upon press molding into the convex part 92c. It is possible to avoid wrinkles, etc. forming in the case sloped parts 92a, 92b by causing the convex part 92c, which does not influence the retaining function of the honeycomb carrier 11, to thereby form in the vicinity of the case sloped parts 92a, 92b, and thus high molding (dimensional) precision of the case sloped parts 92a, 92b is obtained.

It should be noted that the present invention is not to be limited to the above-mentioned embodiments, and that modifications and improvements within a scope that can achieve the object of the present invention are encompassed by the present invention.

In any of the above-mentioned embodiments, although the present invention is applied to a filter (GPF) that collects PM in exhaust gas by being arranged in the exhaust pipe of a gasoline engine, it is not limited thereto. For example, the present invention may be applied to a filter (DPF) that collects the PM in exhaust gas by being arranged in the exhaust pipe of a diesel engine. In this case, since the exhaust gas temperature of the diesel engine is low compared to a gasoline engine, it is suitable to support a PM combustion catalyst that promotes combustive removal of PM on the DPF in place of the three-way catalyst. As the PM combustion catalyst, an Ag-based PM combustion catalyst containing Ag is preferably used from the viewpoint of being able to combustively remove PM at the lowest temperatures.

In addition, in any of the above-mentioned embodiments, in addition to a carrier consisting of cordierite (Cd) as the honeycomb carrier, for example, a honeycomb carrier consisting of SiC, silica, aluminum titanate, etc. may be applied.

In addition, in any of the above-mentioned embodiments, although the sloped part having a sloped flat face sloping in a direction in which the length in the central axis direction of the outer circumferential edge thereof decreases is provided in the outer-circumferential sealing part, it is not limited thereto. For example, it may be configured as a sloped part having a sloped curved face sloping in a direction in which the length of the central axis direction of the outer circumferential edge thereof becomes smaller, and may be configured as a stepped part in a direction in which the length in the central axis direction of the outer circumferential edge thereof becomes smaller.

In addition, in any of the above-mentioned embodiments, although the sealing depths of the outer-circumferential sealing parts are all set to predetermined depths, it is not limited thereto. For example, cells closed by a sealing agent from the exhaust gas inlet side to the outlet side may be provided in a ring shape inside the outer-circumferential sealing part. Since loading the exhaust purifying catalyst only on the radial central part in the catalyst loading step is thereby facilitated, catalyst leaking from the outer-circumferential side face or exhaust gas leakage from the outer-circumferential side face during use is more reliably prevented.

The convex part of the case member in the above-mentioned eighth embodiment and ninth embodiment may be applied to any of the embodiments. In the above-mentioned eighth embodiment, although one convex part is formed over the entire circumference in the vicinity of the case sloped part, it is not limited thereto. For example, a plurality may be formed in the circumferential direction in the vicinity of the case sloped part.

Similarly, although one convex part is formed so as to extend in the central axis direction in the ninth embodiment, it is not limited thereto. For example, a plurality of the convex parts extending the central axis direction may be formed to be separated from each other in the circumferential direction.

In addition, both a convex part extending in the circumferential direction and a convex part extending in the central axis direction may be formed.

In addition, in any of the above-mentioned embodiments, although a so-called 1-bed type exhaust gas purifying device that houses one honeycomb carrier is applied, it is not limited thereto. For example, a so-called 2-bed type exhaust gas purifying device that houses two honeycomb carriers arranged in series in the exhaust gas flow direction may be applied. In particular, since the conventional wrinkles tended to form in the intermediate portion between the first bed and second bed, etc., this can be avoided by the above-mentioned eighth embodiment and ninth embodiment.

What is claimed is:

1. An exhaust gas purifying device that is provided in an exhaust channel of an internal combustion engine and purifies exhaust gas of the internal combustion engine, the exhaust gas purifying device comprising:

a columnar honeycomb carrier in which a plurality of cells, which extend from an inlet-side end face to an outlet-side end face of exhaust gas to form pathways of exhaust gas, is divided and formed by porous partition walls; and a tubular case member that houses the honeycomb carrier via a retaining member, wherein the honeycomb carrier includes a sloped part or stepped part formed at an outer circumferential side of both end faces in a central axis direction thereof and formed so that a cross-sectional area orthogonal to the central axis direction becomes larger towards a side of an outer circumferential edge thereof, and is retained inside of the case member by the sloped part or stepped part catching in an inner wall of the case member via the retaining member, wherein the case member has reduced-diameter parts provided to at least part of an end on an exhaust gas inlet side thereof and with an inside diameter smaller than the outside diameter of a central part of the honeycomb carrier, excluding the sloped part or stepped part in the inlet-side end face, wherein the reduced-diameter parts are provided along arc-shaped regions spanning a predetermined retaining length around a center among the circumferential edge of the tubular case member, and wherein the arc-shaped regions are indented inward of the tubular case member toward the center of the circumferential edge of the case member.

2. The exhaust gas purifying device for an internal combustion engine according to claim 1, wherein the reduced-diameter part has a flat part provided substantially in parallel with an end face at the central part of the honeycomb carrier.

3. The exhaust gas purifying device for an internal combustion engine according to claim 1, further comprising an exhaust gas purifying catalyst loaded on the honeycomb carrier, wherein an inside diameter at a part other than the reduced-diameter part at an end on the exhaust gas inlet side of the case member is a size equal to or greater than the outside diameter of the central part of the honeycomb carrier.

4. The exhaust gas purifying device for an internal combustion engine according to claim 1, wherein the retaining member is disposed between the reduced-diameter part of the case member and the honeycomb carrier, and wherein the retaining member is partially disposed between a part of the case member other than the reduced-diameter part and the honeycomb carrier.

5. The exhaust gas purifying device for an internal combustion engine according to claim 1, wherein the exhaust channel has a curved part that curves to be connected to an upstream side of the case member, and the retaining member is not provided at a part corresponding to a connecting position between the case member and a longest outer circumferential part at which a length in a direction along a pipeline of the curved part is the longest.

6. The exhaust gas purifying device according to claim 1, wherein the case member includes:

a case sloped part or a case stepped part formed to follow the sloped part or stepped part of the honeycomb carrier; and a convex part that is formed in the vicinity of the case sloped part or the case stepped part and at which an inner face thereof is convex towards an outer side.

7. The exhaust gas purifying device according to claim 1, wherein the predetermined retaining length is corresponding to regions of 60 degrees around the center among the circumferential edge of the case.

8. The exhaust gas purifying device according to claim 1, wherein the case member is a clamshell-type case member configured from two case halves divided in a circumferential direction along the central axis direction, and the case member is integrally formed by bringing face to face the case halves which were divided into two and connected to each other at extended parts thereof.

* * * * *